US012135931B1

(12) United States Patent
Coskun et al.

(10) Patent No.: US 12,135,931 B1
(45) Date of Patent: Nov. 5, 2024

(54) SYSTEMS AND METHODS FOR DYNAMIC CHANGES TO FONT CHARACTERISTICS OF TEXT DISPLAYED ON A DISPLAY SCREEN

(71) Applicant: Adeia Guides Inc., San Jose, CA (US)

(72) Inventors: Mustafa Coskun, Kayseri (TR); Vehbi Cagri Gungor, Kayseri (TR)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/215,224

(22) Filed: Jun. 28, 2023

(51) Int. Cl.
*G06F 40/109* (2020.01)
*G06F 3/01* (2006.01)
*G06V 40/18* (2022.01)

(52) U.S. Cl.
CPC ............ *G06F 40/109* (2020.01); *G06F 3/013* (2013.01); *G06V 40/18* (2022.01)

(58) Field of Classification Search
CPC ........ G06F 40/109; G06F 3/013; G06V 40/18
See application file for complete search history.

(56) References Cited

U.S. PATENT DOCUMENTS

| | | | | |
|---|---|---|---|---|
| 9,704,216 | B1 * | 7/2017 | Laskar | G06F 3/012 |
| 9,846,684 | B2 | 12/2017 | Beaver et al. | |
| 10,140,957 | B1 * | 11/2018 | Letourneur | G06F 3/0483 |
| 10,416,861 | B2 * | 9/2019 | Cietwierkowski | G06F 9/451 |
| 11,106,274 | B2 * | 8/2021 | Schluessler | G06F 3/013 |
| D949,164 | S | 4/2022 | Chang et al. | |
| 2012/0324348 | A1 * | 12/2012 | Rounthwaite | G06F 40/103 |
| | | | | 715/256 |
| 2013/0057553 | A1 * | 3/2013 | Chakravarthula | G06F 3/0484 |
| | | | | 345/472 |
| 2013/0235073 | A1 * | 9/2013 | Jaramillo | G09G 5/00 |
| | | | | 345/619 |
| 2013/0250086 | A1 * | 9/2013 | Mar | H04N 23/611 |
| | | | | 348/78 |
| 2014/0137054 | A1 * | 5/2014 | Gandhi | G06F 3/013 |
| | | | | 715/865 |

(Continued)

FOREIGN PATENT DOCUMENTS

CN 111913561 A * 11/2020 ............. G06F 3/013

OTHER PUBLICATIONS

Anonymous, "Global leader in eye tracking for over 20 years," [retrieved from URL: https://www.tobii.com/],1-8, (2023).

(Continued)

*Primary Examiner* — James J Debrow
(74) *Attorney, Agent, or Firm* — Haley Guiliano LLP

(57) ABSTRACT

In an iterative process, text for display to a user is generated at an output, the text rendered based on initial font characteristics. While the user reads the text, raw data relating to readability of the text is received via an input. Feedback data is generated from the raw data and communicated to an analysis agent for readability analysis. New font characteristics are received from the analysis agent. Displaying the text to the user, generating feedback data, and communicating the feedback data to the analysis agent is repeated until preferred font characteristics are identified to have better readability than others analyzed. The preferred font characteristics are received from the analysis agent, and text continues to be generated for display to the user, the text rendered based on the preferred font characteristics.

20 Claims, 13 Drawing Sheets

(56) References Cited

U.S. PATENT DOCUMENTS

| | | | |
|---|---|---|---|
| 2014/0354531 A1 | 12/2014 | Foreman | |
| 2016/0005146 A1* | 1/2016 | Thurling | G09G 3/2092 345/661 |
| 2016/0011657 A1* | 1/2016 | Estacio | G06V 40/193 345/156 |
| 2016/0231914 A1* | 8/2016 | Sinn et al. | G06F 3/04847 |
| 2018/0276765 A1* | 9/2018 | Yuen | G06Q 40/125 |
| 2020/0073936 A1* | 3/2020 | Jankowski | G06F 40/279 |
| 2021/0142765 A1* | 5/2021 | Malhotra | G09G 5/10 |

OTHER PUBLICATIONS

Bernard, M., et al., "A comparison of popular online fonts: Which size and type is best," Usability news, 4(1):1-8 (2002).

Bigelow, C., "Typeface features and legibility research," Vision Research, 165:162-172 (2019).

Coşkun, M., "Fast computation of Katz index for efficient processing of link prediction queries," Data Min Knowl Disc, 35:1342-1368 (2021).

Coşkun, M., et al., "Node similarity-based graph convolution for link prediction in biological networks," Bioinformatics, 37(23):4501-4508 (2021).

De Bruijn, D., et al., "The influence of screen size and text layout on the study of text," Behaviour & Information Technology, 11:2, 71-78 (1992).

Huang, M.X., et al., "Building a personalized, auto-calibrating eye tracker from user interactions," Proc. CHI, 1-10 (2016).

Landolt, C., "Visual factors in reading," Vision Research, 161:60-62 (2019).

Samuel, S., "Facebook is building tech to read your mind. The ethical implications are staggering," [retrieved from URL: https://www.vox.com/future-perfect/2019/8/5/20750259/facebook-ai-mind-reading-brain-computer-interface], 1-5 (2019).

Sutton, R., et al, "Reinforcement Learning: An Introduction," The MIT Press, 1-10 (2018).

Xu, P., et la., "Turkergaze: Crowdsourcing saliency with webcam based eye tracking," [retrieved from URL: arXiv preprint arXiv:1504.06755], 1-9 (2015).

Youngs, I., "Younger viewers prefer TV subtitles, research suggests," [retrieved from https://www.bbc.com/news/entertainment-arts-59259964], 1-6 (2021).

Jin, J.C., et al., "The effect of iridotomy on iris contour," American journal of ophthalmology,110(3);260-263 (1990).

Papoutsaki, A., et al., "WebGazer: Scalable Webcam Eye Tracking Using User Interactions," Proceedings of the Twenty-Fifth International Joint Conference on Artificial Intelligence (IJCAI-16), 3839-3845 (2016).

* cited by examiner

231 →

| | States | | | | | | |
|---|---|---|---|---|---|---|---|
| Actions | | Arial Small | Arial Medium | Arial Large | Calibri Small | Calibri Medium | Calibri Large | ... |
| | Within Fonts | 0 | 0 | 0 | 0 | 0 | 0 |
| | Across Fonts | 0 | 0 | 0 | 0 | 0 | 0 |

| | States | | | | | | |
|---|---|---|---|---|---|---|---|
| Actions | | Arial Small | Arial Medium | Arial Large | Calibri Small | Calibri Medium | Calibri Large | ... |
| | Within Fonts | 0 | 0 | 0 | 50 | 0 | 0 |
| | Across Fonts | 0 | 0 | 0 | 0 | 0 | 0 |

251 →

| | States | | | | | | |
|---|---|---|---|---|---|---|---|
| Actions | | Arial Small | Arial Medium | Arial Large | Calibri Small | Calibri Medium | Calibri Large | ... |
| | Within Fonts | 0 | 0 | 0 | 50 | 60 | 0 |
| | Across Fonts | 0 | 0 | 0 | 0 | 0 | 0 |

261 →

| | States | | | | | | |
|---|---|---|---|---|---|---|---|
| Actions | | Arial Small | Arial Medium | Arial Large | Calibri Small | Calibri Medium | Calibri Large | ... |
| | Within Fonts | 70 | 100 | 80 | 50 | 60 | 65 |
| | Across Fonts | 0 | 60 | 0 | 0 | 0 | 0 |

FIG. 10

SYSTEMS AND METHODS FOR DYNAMIC CHANGES TO FONT CHARACTERISTICS OF TEXT DISPLAYED ON A DISPLAY SCREEN

BACKGROUND

This disclosure is generally directed to systems and methods for dynamic font changes on a display screen. In particular, systems and methods are provided herein that iteratively display text to a user based on prescribed font characteristics, generate feedback data while the user reads the text, and through analysis of the feedback data, dynamically adjust the font characteristics as part of each iteration to increase the readability of the text for the user.

SUMMARY

People read text on screens daily, including text on smartphones and tablets (e.g., websites, digital books, and social media), text on computers (e.g., websites, documents, email, and social media), text on smart TVs (e.g., subtitles/closed captions overlaid on videos), and text on VR/AR headsets (e.g., subtitles/closed captions, AR information, digital books). Among all the different types of devices with all the different types of display screens and all the different circumstances in which users read text on those devices and display screens, almost universally it is left to the user to select a font type, a font size, and sometimes even a font color in which to display the text so that the user may make the text more readable. Certain devices even provide more options for changing how text is displayed to the user, and often, the more options that are offered, the more difficult it is for the user to select a set of font characteristics that optimize readability. And while some users are able to find a suitable set of font characteristics that makes the text very readable for them, many end up settling on a default combination, even if that default combination presents no readability advantages for an individual user. As a result, many users are not able to find a set of font characteristics that works well for them. This can be in part due to the narrow set of options often provided for adjusting the displayed text, such as having to choose between three font types, three font sizes (e.g., small, medium, and large), and five font colors. In other circumstances, the user can be so overwhelmed with font type choices and font size choices that they may have a difficult time identifying which combination works best for them. Accordingly, the systems and methods disclosed herein provide the ability to display text on a display screen to a user, obtain feedback while the user is reading the text, and dynamically adjust the font characteristics based on the feedback to optimize readability for the user.

These systems and methods present distinct advantages for improving the readability of text for users. For example, even on a single device, each user of the device may have text displayed based on preferred font characteristics that optimize reading speed along with user processing and comprehension of the material being read. In addition, the readability optimization may be performed on a user device per application, such that the text may displayed using different font characteristics in different applications (e.g., word processing, web browser, digital book, etc.) to account for differences in a user's reading speed in each application.

As discussed in greater detail below, the systems and methods presented herein provide dynamic optimization of font characteristics for displaying text. For example, changes to font type, font size, and/or font color may be made to optimize readability of text displayed to a user on a display screen. In some embodiments, a user device (e.g., a smart home assistant, a smart TV, a smartphone, a tablet computer, a laptop computer, and the like) may display text using initial font characteristics to a user on a display screen, and while the user is reading the text, the user device generates feedback data. In an iterative process, initial font characteristics and the feedback data are communicated to an analysis agent, and in response, the user device receives from the analysis agent different font characteristics to use for displaying text to the user. Displaying text using suggested font characteristics, generating feedback data, and communicating both to the analysis agent may be repeated iteratively until the user device receives from the analysis agent preferred font characteristics for displaying text to the user. As a result of this iterative process, the preferred font characteristics are identified to optimize readability of text on the display screen for the user.

Systems and methods are also presented herein in which an analysis agent receives font characteristics and feedback data from a user device in an iterative process. As part of such embodiments, the analysis agent determines, based on the received font characteristics and feedback data, a readability score for the font characteristics and then communicates to the user device different font characteristics for displaying text to the user. This communication and analysis process continues until the analysis agent identifies, through comparison of readability scores, preferred font characteristics, which are then communicated to the user device for displaying text to the user. As a result of this iterative process, the preferred font characteristics are identified to optimize readability of text on the display screen for the user.

In some embodiments, the iterative process may be truncated after a first pass, such that the font characteristics received by the user device, following communication of the initial font characteristics and feedback data to the analysis agent, represents a single-step dynamic change to the font characteristics used to display text to the user by the user device. Such dynamic change is performed without the user having to make a conscious decision about the font type, font size, font color, etc., used to display the text on the display screen.

BRIEF DESCRIPTION OF THE DRAWINGS

The above and other objects and advantages of the disclosure may be apparent upon consideration of the following detailed description, taken in conjunction with the accompanying drawings, in which:

FIG. 9 is an exemplary lookup table that may be used as part of the process for dynamically changing the font characteristics for displaying text to a user for purposes of increasing readability of the text for the user, in accordance with some embodiments of the present disclosure;

FIG. 10 illustrates an exemplary process for populating a lookup table that may be used as part of the process for dynamically changing the font characteristics for displaying text to a user for purposes of increasing readability of the text for the user, in accordance with some embodiments of the present disclosure;

DETAILED DESCRIPTION

Figure 1:
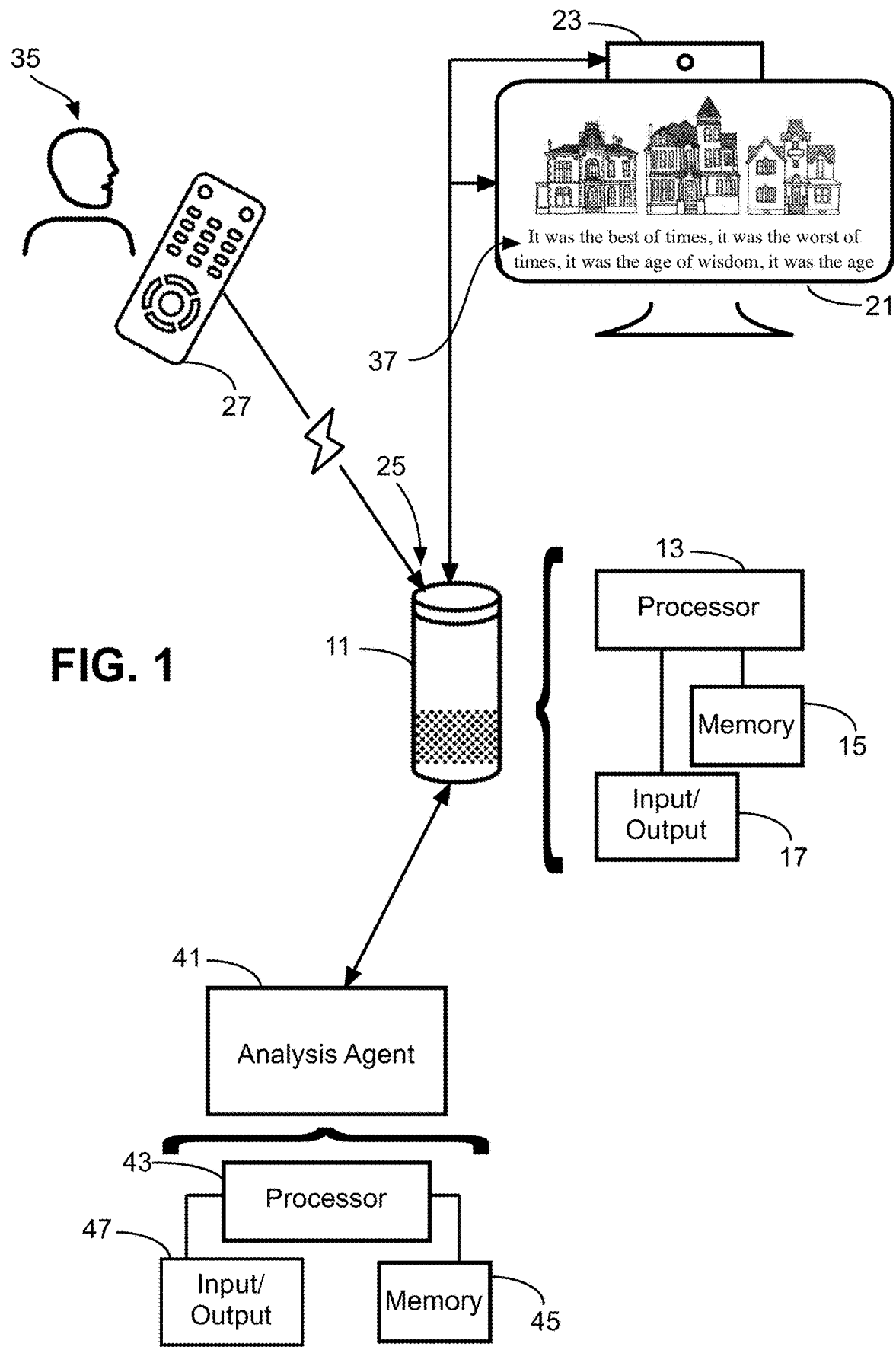
FIG. 1 shows an exemplary environment in which the font characteristics for displaying text to a user may be dynamically adjusted to increase readability of the text for the user, in accordance with some embodiments of the present disclosure.

Turning in detail to the drawings, FIG. 1 shows a first example of an environment in which a user device 11 may dynamically adjust the font characteristics used to display text to a user 35. The user device 11 includes a processor 13 in communication with a memory 15 and an input/output 17, and as such, the user device 11 is a computing device. In some embodiments, the input/output 17 may have several components to provide communications capabilities using different protocols (e.g., Wi-Fi®, Bluetooth®, USB, Ethernet, serial, and other wired and/or wireless protocols) and to enable communications with various other devices (e.g., display 21, remote control 27, analysis agent 41, and other networked or directly connected devices). The processor 13 and the memory 15 in combination serve as control circuitry to perform the functions of the user device 11 as described herein. As shown in this example, the user device 11 is a smart home assistant. The input/output 17 of the user device 11 enables the processor 13 to have two-way communication with the display screen 21 and the eye tracker 23. As shown the eye tracker 23 is mounted to the display screen 21. In some embodiments, the eye tracker 23 may be separate from the display screen 21. The display screen 21 is used by the user device 11 to display text to the user 35. The text displayed to the user may be from any text source the user 35 desires to be displayed on the display screen 21. Examples of text sources include closed caption or subtitle text as part of a video, text from a digital document, and the like. The user device 11 may interact with and control the eye tracker 23 using the input/output 17. As described in greater detail below, the eye tracker 23 may be controlled to generate raw data as the user 35 reads text displayed on the display screen 21. The input/output 17 of the user device 11 also enables the processor 13 to receive communications from the remote control 27. The remote control 27 enables the user 35 to interact with the user device 11. In some embodiments, the remote control 27 may include a microphone (not shown), which enables the user 35 to interact with the user device 11 through voice commands.

For purposes of dynamically changing font characteristics as described herein, the user device 11 communicates with the analysis agent 41, which includes a processor 43 in communication with a memory 45 and an input/output 47. The processor 43 of the analysis agent 41 may also communicate with other devices via the input/output 47. In some embodiments, the input/output 47 may include several components to provide communications capabilities using different protocols (e.g., Wi-Fi®, Bluetooth®, USB, Ethernet, serial, and other wired and/or wireless protocols) and to enable communications with various other devices and/or networks. The environment of FIG. 1 thus also shows an example of an environment in which the analysis agent 41 may assist the user device 11 in dynamically changing font characteristics used to display text to a user.

In the environment shown in FIG. 1, the user device 11 displays text to the user 35 by generating and rendering the text 37 for display on the display screen 21. By way of example, the text 37 being displayed to the user 35 is narration subtitles from the start of a video based on the book "A Tale of Two Cities" by Charles Dickens. The text 37 is at first displayed based on first font characteristics. The first font characteristics may be identified by the user device 11 based on considerations including pre-determined default font characteristics identified by the user 35, the context in which the text is to be displayed, a genre of video being displayed with the text, the social media platform, and the like. In some embodiments, the user device 11 may communicate with the analysis agent 41 to have the analysis agent 41 identify the first font characteristics. The font characteristics are a set of characteristics describing how to display text on a display screen and may include: font type, font size (e.g., point size), font color, bold, italics, underline, kerning, background color, and the like. Any two font characteristics are considered different if each causes text to be displayed differently as compared to the other. For example, if first font characteristics include the font type Arial and a font size of 12 point, and if second font characteristics include the font type of Arial and a font size of 14 point, the first font characteristics are different from the second font characteristics.

During the process of dynamically adjusting the font characteristics in which text is displayed to the user 35, the user device 11 communicates with the eye tracker 23 to collect raw data from the eye tracker 23. As shown, the eye tracker 23 is positioned adjacent the display screen 21. This positioning of the eye tracker helps provide the eye tracker 23 with an unobstructed view of the user 35 as the user 35 is reading text displayed on the display screen 21. The raw data represents eye movements of the user 35 as the user 35 reads the text 37 on the display screen 21. In some embodiments, the raw data may also represent facial expressions of the user 35 as the user 35 reads the text on the display screen 21. The facial expressions tracked using the eye tracker 23 may include eye squints and pupil dilations, among others. In addition, the eye tracker 23 may track the use of glasses, taking off or putting on glasses, and other user actions that may be associated with reading the text 37 on the display screen 21.

In some embodiments, the eye tracker 23 may obtain images of the user, with the images being incorporated into the feedback data. Through image classification, images of the user may be used to determine whether the user is wearing glasses, whether the user is farsighted, nearsighted, or uses bifocals to read; the images may also be used to determine an approximate age of the user. Such feedback data may be used by the analysis agent 41 in determining font characteristics to suggest for displaying text to the user. In some embodiments, the eye tracker 23 may determine the length of time the user has been reading, and this information may be included in the feedback data to be taken into account by the analysis agent. For example, the analysis agent may suggest trying different font characteristics if the user has only been reading for 10 minutes, as compared to a user who has been reading for over an hour. In some embodiments, the eye tracker 23 may include time codes with the raw data, and such time codes may be taken into account by the analysis agent. For example, the analysis agent may suggest trying different font characteristics if the user is reading in the morning hours as compared to a user reading in the dark hours of the evening. In some embodiments, the size of the user's pupil may be tracked by the eye tracker 23 and included as part of the feedback data. In such embodiments, changes in the size of the user's pupil may be indicators as to whether the user is comprehending the text displayed on the screen, and where there is an indication that the user is not comprehending the text, the analysis agent may suggest trying different font characteristics to improve user comprehension of the text. In some embodiments, the eye tracker 23 may also track the user's head movement, such that head movement information is included in the feedback data. In such embodiments, the user's head movement may be used in combination with the user's eye movement to improve readability evaluations by the analysis agent 41.

In some embodiments, the eye tracker 23 may be a commercial eye tracking system, such as the EyeX eye tracking system from Tobii® of Stockholm, Sweden. In some embodiments, the eye tracker 23 may be webcam-based eye tracking tools, such as PACE from Ennable (http://www.ennable.com), Turkergaze project through Princeton University (available on Github at https://github-.com/Princeton Vision/TurkerGaze), and WebGazer project through Brown University (available on Github at https://github.com/brownhci/WebGazer). Such systems may be used to track eye movements of the user 35, and some are also able to determine the number of words per minute read by the user and facial expressions and other reading-related actions of the user 35.

Github at https://github.com/Princeton Vision/TurkerGaze), and WebGazer project through Brown University (available on Github at https://github.com/brownhci/WebGazer). Such systems may be used to track eye movements of the user 35, and some are also able to determine the number of words per minute read by the user and facial expressions and other reading-related actions of the user 35.

During display of the text 37 to the user 35, the user 35 may interact with the user device 11 using the remote control 27. For example, if the user 35 is watching a movie with subtitles displayed, the user may pause the movie or skip backward or forward in the movie. Such interactions may occur by the user 35 pressing a button on the remote control 27 or by the user 35 using voice commands for embodiments in which the user device 11 or the remote control 27 includes a speaker. In some embodiments, the user device 11 may interpret interactions with the user 35 as feedback, and that feedback may inform the process of dynamically changing the font characteristics used to display text to the user 35.

Figure 2:
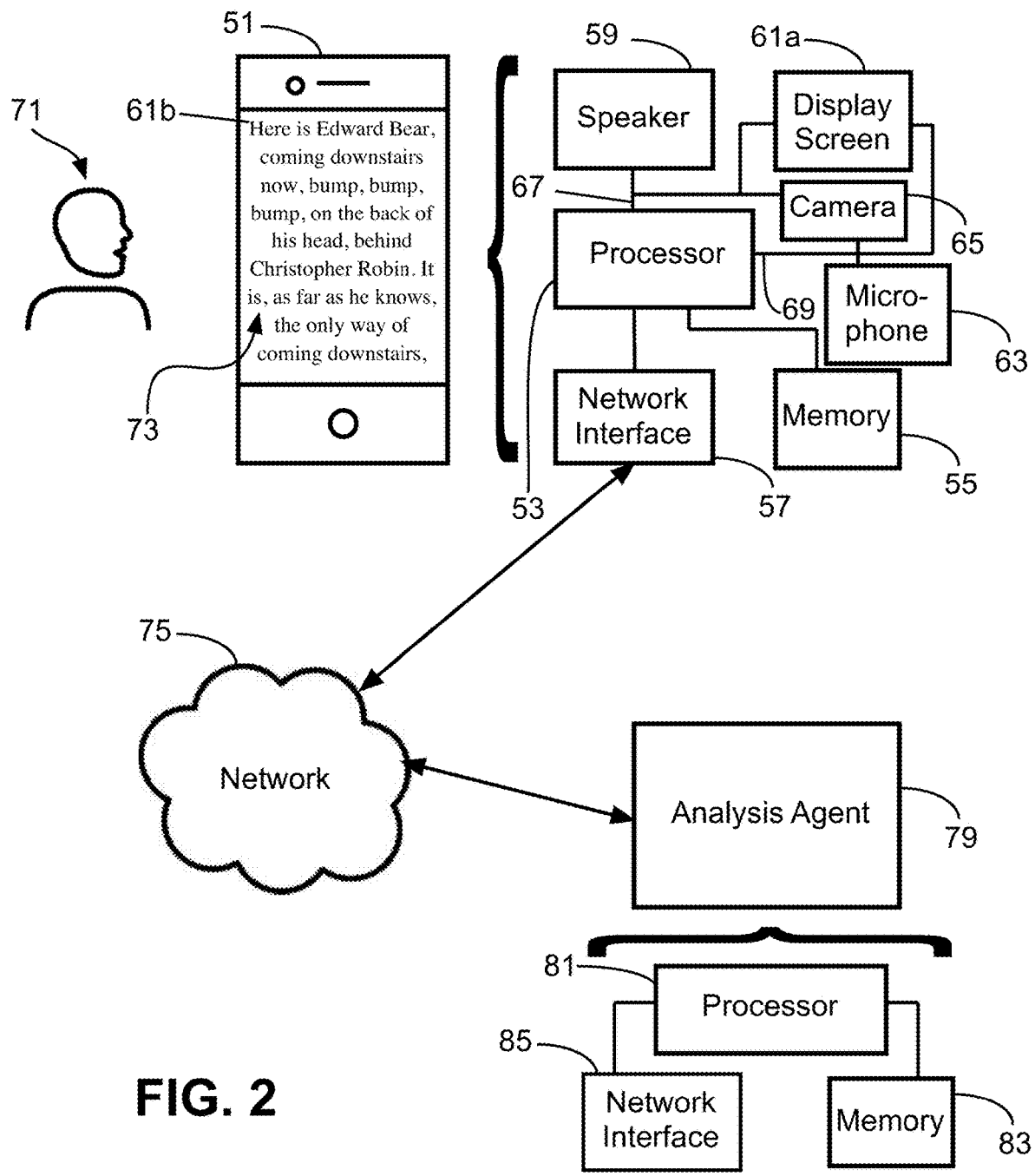
FIG. 2 shows another exemplary environment in which the font characteristics for displaying text to a user may be dynamically adjusted to increase readability of the text for the user, in accordance with some embodiments of the present disclosure.

A second example of an environment in which a user device 51 may dynamically change the font characteristics used to display text to a user 71 is shown in FIG. 2. In this embodiment, the user device 51 is a smartphone and includes a processor 53 in communication with a memory 55, a network interface 57, a speaker 59, a display screen 61a, a microphone 63, and a camera 65. The processor 53 and the memory 55 in combination serve as control circuitry to perform the functions of the user device 51 as described herein. The processor 53 also includes an output 67 for communicating with the display screen 61a/b, which is shown, for purposes of clarity, both in schematic form (display screen 61a) and in component form (as the front face 61b of the user device 51). However, it should be recognized that the user device 71 shown in FIG. 2 has only a single display screen. The processor 53 also uses the output 67 for communicating with the speaker 59 and the camera 65. The display screen 61a is used by the user device 51 to display text to the user 71. The text displayed to the user 71 may be from any text source the user 71 desires to be displayed on the display screen 61a, whether the text is displayed on its own (e.g., as part of a digital book) or as part of audio and/or visual media content (e.g., subtitles as part of a movie).

The user device 51 includes an input 69 through which the processor 53 receives audio signals from the microphone 63, which the user 71 may use for voice control of the user device 51, input signals from the display screen 61b, which on a smartphone is responsive to touches by the user 71, and input signals from the camera 65. The user 71 may use the microphone 63 to communicate a voice command to the user device 51 via the input 69. The processor 53 may send and receive communications from and to the camera 65, such that in combination, the processor 53 and the camera 65 may function as an eye tracker. As described in greater detail below, when the processor 53 and the camera 65 function as an eye tracker, feedback data may be generated as the user 71 reads text displayed on the display screen 61a.

The processor 53 of the user device 51 may communicate with other devices on the network 39 using the network interface 57. As such, the network interface 57 serves as both an input and an output for the user device 51 when communicating with other networked devices. Through use of the network 75, the user device 51 may communicate with other networked devices, servers, cloud services, application programming interfaces (APIs), and the like. In some embodiments, the network 75 may be a public network such as the Internet. In certain other embodiments, the network 75 may be some other private or public wide area network. For purposes of dynamically changing font characteristics as described herein, the user device 51 communicates with the analysis agent 79, which includes a processor 81 in communication with a memory 83 and a network interface 85. The processor 81 of the analysis agent 79 may communicate with other devices, including the user device 51, on the network 75 using the network interface 85. As such, the network interface 85 serves as both an input and an output for the analysis agent 79 when communicating with other networked devices. The environment of FIG. 2 thus also shows an example of an environment in which the analysis agent 79 may assist the user device 51 in dynamically changing font characteristics used to display text to a user.

In some embodiments, the user device 51 and/or the analysis agent 79 may include additional inputs, additional outputs, dedicated inputs, or dedicated outputs, and each input and/or output may provide the user device with a different protocol for communicating with other devices, whether wired, wireless, direct, or networked.

In the environment shown in FIG. 2, the user device 51 displays text to the user 71 by generating and rendering the text 73 for display on the display screen 61*b*. By way of example, the text 73 being displayed to the user 71 is the digital book "Winnie the Pooh" by A. A. Milne. The text 73 is at first displayed based on first font characteristics. The first font characteristics may be identified by the user device 51 based on considerations including pre-determined default font characteristics identified by the user 71, the context in which the text 73 is to be displayed, and the like. In some embodiments, the user device 71 may communicate with the analysis agent 79 to have the analysis agent 79 identify the first font characteristics. As indicated above, font characteristics may include font type, font size (i.e., point size), font color, bold, italics, underline, kerning, background color, and the like.

During the process of dynamically adjusting the font characteristics in which text is displayed to the user 71, the processor 53 and the camera 65 in combination function as an eye tracker to collect raw data as the user 71 reads the text 73. The raw data represents eye movements of the user 71 as the user 71 reads the text 73 on the display screen 61*b*. In some embodiments, the raw data may also represent facial expressions of the user 71 as the user 71 reads the text 73 on the display screen 61*b*. The facial expressions tracked may include eye squints and pupil dilations, among others. In addition, the use of glasses, taking off or putting on glasses, and other user actions may be tracked, insofar as the tracked actions can be associated with reading the text 73 on the display screen 61*b*.

The eye tracking functionality of the user device 51 may be webcam-based eye tracking tools, such as PACE from Ennable (http://www.ennable.com), Turkergaze project through Princeton University (available on Github at https://github.com/Princeton Vision/TurkerGaze), and WebGazer project through Brown University (available on Github at https://github.com/brownhci/WebGazer). Such eye tracking tools may be readily adapted to the smartphone environment (along with other types of personal user devices) for purposes of tracking eye movement and facial expressions of the user 71.

During display of the text 37 (in FIG. 1) to the user 35, the user 35 may interact with the user device 11 using the remote control 27. For example, if the user 35 is watching a movie with subtitles displayed, the user may pause the movie or skip backward or forward in the movie. Such interactions may occur by the user 35 pressing a button on the remote control 27 or by the user 35 using voice commands for embodiments in which the user device 11 or the remote control 27 includes a speaker. In some embodiments, the user device 11 may interpret interactions with the user 35 as feedback, and that feedback may inform the process of dynamically changing the font characteristics used to display text to the user 35.

The user device may take different forms than those described above while still enabling the process of dynamically changing the font characteristics used to display text to a user. As one example, the user device may be a video game console. As another example, the user device may be an VR/AR headset. As still another example, the user device may be a kiosk that is accessible by and provides information to the public. In such an embodiment, the media content presented at the time of the voice query could be a video game that is being played by the user.

Figure 3:
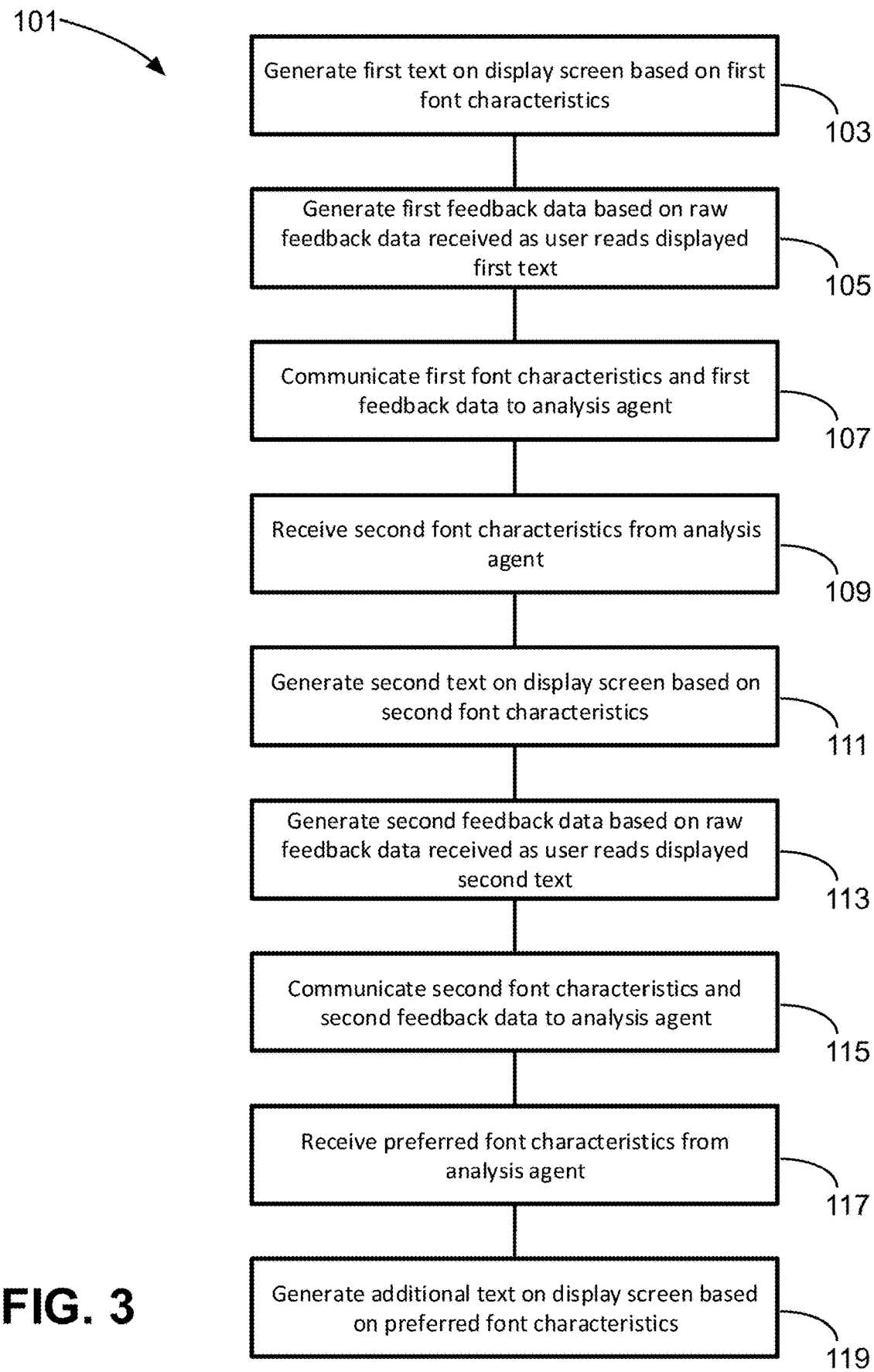
FIG. 3 shows a flowchart of illustrative steps involved in dynamically changing the font characteristics for displaying text to a user for purposes of increasing readability of the text for the user, in accordance with some embodiments of the present disclosure.

FIG. 3 shows a flowchart illustrating the steps of a process 101 for enabling a user device to dynamically change the font characteristics used to display text to a user. The process 101 may be implemented on any of the aforementioned user devices (e.g., user device 11, 51 and the like). In addition, one or more actions of the process 101 may be incorporated into or combined with one or more actions of any other process or embodiments described herein. At step 103, the user device generates a first text on a display screen based on first font characteristics. For example, the text 37 shown in FIG. 1 may be rendered by the user device for output to the display screen based on the following font characteristics: the font type is Arial; the font size is 12 points; and the font color is black. At step 105, the user device generates first feedback data based on raw data received as the user reads the displayed first text.

The raw data is generated by the eye tracker, and the eye tracker may be a distinct subsystem, such as is shown in FIG. 1, or it may be an integrated functional subsystem of the user device. In some embodiments, the eye tracker may be associated with a head-mounted display (HMD), such as augmented reality (AR) glasses. The raw data may include raw coordinate data which shows eye movement, a calculated reading speed (the calculation performed by the eye tracker) based on raw coordinate data showing eye movement, facial expression data, and other types of data which is capable of being collected as the camera of the eye-tracking system records the user while the user is reading the text displayed on the screen. In circumstances where the raw data includes raw coordinate data showing eye movement, the user device may calculate the reading speed itself.

The raw data collected by the eye tracker is considered implicit feedback data, as this form of data provides information about how well the user is able to read the displayed text without requiring any actions from the user other than attempting to read the displayed text. Types of implicit feedback data include eye movement, reading speed (words per minute), reading the same text more than once (referred to as backtrack eye movements), facial expressions (e.g., squinting to read the text), pupil dilations, and actions such as putting on or taking off glasses. In some embodiments, the raw data collected by the eye tracker may additionally include facial expression data, lip movement data (some people move their lips and whisper while they read), blink data, and other data relating to the user's face while reading. Such additional raw data may be incorporated directly into the feedback data communicated to the analysis agent, and it may also/alternatively be used by the eye tracker to enhance the raw data collected concerning eye movement. Explicit feedback data may also be collected by the user device and incorporated into the first feedback data. Explicit feedback data may include intentional interactions between the user and the user device, and such intentional interactions are referred to as text display actions. A user may accomplish a text display action by pressing a button on the remote control (in embodiments that include a remote control), speaking to the user device using voice commands, touching the display screen (in embodiments that include a touch-sensitive display screen), or through any manner in which the user device enables user input. Such user actions are received by the user device as instructions from the user to perform an indicated task, in this case perform a text display action. Text display actions may include changing the font size in a font size change action, changing the font color in a font color change action, changing the background color in a background color change action, pausing the display of text on the display screen in a text pause change action, rewinding a video or going backward in digital text to view a portion again in a step backward change action, and a stop font change action which prevents all further changes to the font used to display text on the display screen. Other types of express change actions intentionally performed by the user may also be included as part of the raw data, and thus also included as part of the first feedback data. Once the user device has received the raw data, then the user device generates the first feedback data that is to be communicated to the analysis agent.

At step 107, the user device communicates the first font characteristics and the first feedback data to the analysis agent. In some embodiments, the user device and the analysis agent may reference font characteristics using unique identifiers. In such embodiments, the use of unique identifiers for font characteristics may aid in speeding up the process 101. At step 109, the user device receives the second font characteristics from the analysis agent. The second font characteristics are different from the first font characteristics and will be used to render the text displayed to the user on the display screen. At step one 111, the user device generates the second text for display on the display screen based on the second font characteristics. For example, the text may be rendered by the user device for output to the display screen based on the following second font characteristics: the font type is Arial; the font size is 14 points; and the font color is black. At step 113, the user device generates second feedback data based on raw data received as the user reads the displayed second text. The second feedback data may include the same types of implicit and explicit feedback data described above. At step 115, the user device communicates the second font characteristics and the second feedback data to the analysis agent. At step 117, the user device receives preferred font characteristics from the analysis agent. The preferred font characteristics are determined by the analysis agent in a manner described in greater detail below. At step 119, the user device generates the additional text on the display screen based on the preferred font characteristics.

Figure 4:
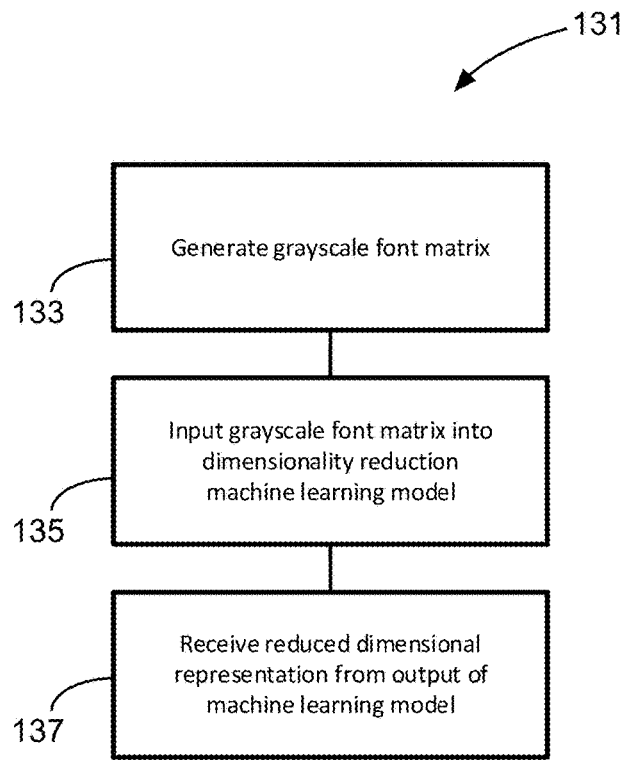
FIG. 4 shows a flowchart of illustrative steps involved in mapping fonts to a reduced dimensional representation in 2D space, in accordance with some embodiments of the present disclosure.
Figure 5:
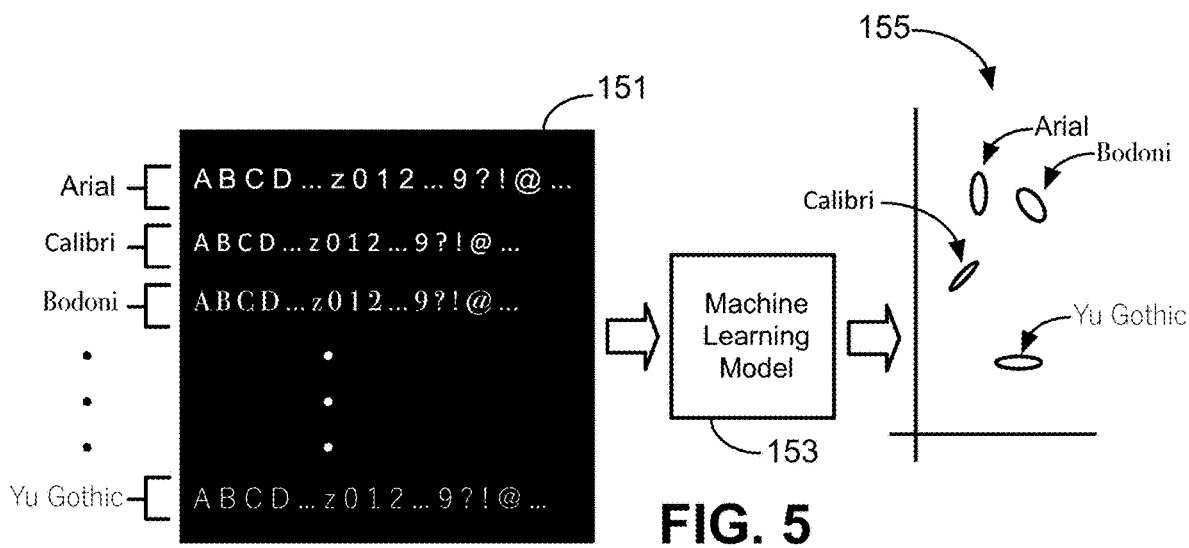
FIG. 5 illustrates an exemplary process of mapping fonts to a reduced dimensional representation in 2D space, in accordance with some embodiments of the present disclosure.

FIGS. 4-5 illustrate a process for reducing the dimensionality of font characteristics so that a comparison between font characteristics may be performed quickly and efficiently during the process of dynamically adjusting the font used to display text to a user. For purposes of simplifying this description, only the font type and font size are discussed as part of this dimensionality reduction process. However, it is to be understood that other aspects of font characteristics may be included in the dimensionality reduction. This dimensionality reduction process is performed prior to displaying any text to a user and is used to represent font characteristics in fewer dimensions (e.g., 2D, 3D, or 4D) to facilitate finding similarities in different font characteristics (e.g., such as similarities between different font types). Being able to identify similarities between different font characteristics reduces the computational requirements for the analysis agent, and this is particularly helpful when the analysis agent is tasked with determining which next font characteristics to suggest for displaying text to the user by the user device.

A process for creating a reduced dimensional representation of font characteristics is shown in the flowchart 131 of FIG. 4. At step 133, a grayscale font matrix is generated for a plurality of font characteristics, each including a different font type. At step 135, the grayscale font matrix 151 is input into a dimensionality reduction machine learning model, and at step 137, the reduced dimensional representation is received from the output of the machine learning model.

In some embodiments, the grayscale font matrix may include a single set of font characteristics. However, a grayscale font matrix with several sets of font characteristics, each set of which is to undergo dimensional reduction, may be used to introduce efficiencies into the dimensionality reduction process. An exemplary grayscale font matrix 151 is shown in FIG. 5. This grayscale font matrix 151 is formed by creating a uniform grayscale background and placing all the characters of several sets of font characteristics in white on the grayscale background, with characters rendered based on each set of font characteristics placed on a single line across the grayscale background. For purposes of convenience, the grayscale font matrix 151 shown does not include the entirety of characters for each set of font characteristics, but it is to be understood that all characters of each font are included in the grayscale font matrix 151. The grayscale font matrix 151 is input into a dimensionality reduction machine learning model 153. The machine learning model 153 may be a singular value decomposition (SVD) model, a principal component analysis (PCA) model, and the like. Such models are known for using concepts found in linear algebra to identify structure and components within complex data sets. By treating the graphical representation of font characteristics as complex data sets (here white letters placed on a grayscale background), this process can create a 2D font representation for each set of font characteristics, and these 2D font representations facilitate comparisons between the different font characteristics. Importantly for purposes of the processes disclosed herein, the lower dimensional representation of font characteristics maintains important parts of the original similarities between the font characteristics, but in a lower dimensional, and less complex, space.

This dimensionality reduction process 131 eliminates the need to perform a character-by-character comparison of different font characteristics in order to determine which font characteristics are more alike and which font characteristics are less alike. Moreover, since the machine learning model 153 generates the reduced dimensional representation with only two dimensions, the process of performing comparisons between two sets of font characteristics is significantly simplified. The reduced dimensional representation generated at the output of the machine learning model is shown as a 2D graphical representation 155 in FIG. 5. The 2D graphical representation 155 shown includes four sets of font characteristics (Arial, Bodoni, Calibri, and Yu Gothic, each at the same type size), with each set of font characteristics represented by a 2D font representation, here shown as oval shapes, and each oval shape is positioned uniquely within the 2D coordinate axes. The oval shape representing each set of font characteristics generally has a different curvature and a different orientation and position within the 2D coordinate axes of the 2D graphical representation 155. The 2D font representation of each set of font characteristics therefore has a well-defined relationship with each of the other font representations depicted in the 2D space.

A collection of 2D font representations of various sets of font characteristics may be used as a tool to simplify the process of optimizing readability of text for a user by reducing the computational and analytical requirements of the process. It is important to note, however, that optimizing readability can be highly dependent upon the context in which the text is displayed to the user. For example, first font characteristics might be determined to optimize readability for a particular user when the text is being presented as part of an electronic book, while second font characteristics, different from the first font characteristics, might be determined to optimize readability for the same user when the text is being presented as subtitles to a movie. In fact, the first font characteristics and the second font characteristics in this example may be substantially different in both font type and font size. The question of which font characteristics optimize readability for the user in which context is answered through analysis of feedback data received from the eye tracker while the user is reading the text in context.

The workflow process of an eye tracker is generally known in the art, such that only a brief overview of the eye tracker process, for tracking a user's eyes while the user is reading text, is being provided for purposes of this description. Whether the eye tracker is a separate and distinct system or functionally integrated as a subsystem into the user device, the eye tracking process starts by collecting images of the user while the user reads text on a display screen. The images are processed using a face detection algorithm, which determines both a face position, relative to the camera, and pupil positions. From the face and pupil positions, eye features can be constructed using, for example, an RGB color map of the images. Eye trackers typically have a calibration mode, which has the users stare at computer-generated dots on a display screen and assigns values to positions across the display screen. For example, the left side of display screen may have a position value of zero, the middle part of the display screen may have a position value of 50, and the right side may have a position value of 100. The same process of assigning position values may also be performed along a vertical axis of the display screen. Eye images and the calibration position values are then fed into a machine learning regression model, such as a logistic regression (LR) model, for processing and analysis. Once the regression model is trained, it may be used to determine position values of test images generated from the user looking at the display screen and using the training images to determine eye features and position values for the test images. In some embodiments, the eye tracker may already have the capability to calculate the reading speed of the user, in words read per minute, and in such systems, the reading speed of the user may be the raw data received as input by the user device.

In some embodiments, the position values determined by the eye tracker may be the raw data received as input by the user device. In such embodiments, the user device calculates the reading speed of the user, in words per minute, based on the raw data. Calculation of the reading speed of the user may be achieved by tracking the left-to-right eye movements of the user and determining the reading speed based on the left-to-right eye movements (when the text is, e.g., English) and the known number of words displayed in a line of text on the display screen at the time the movements were recorded. If the calculated reading speed for a particular line or lines of text is much lower than the reading speed of the average user, this might mean that the user is daydreaming or fixating on something other than the text. In such instances, the reading speed calculation for such lines may be discarded from the overall determination of reading speed. Conversely, if the calculated reading speed for a particular line or lines of text is much higher than the reading speed of the average user, this might mean that the user is quickly skimming the text without full comprehension of the text. In such instances, the reading speed calculation for such lines may again be discarded from the overall determination of reading speed.

Figure 6:
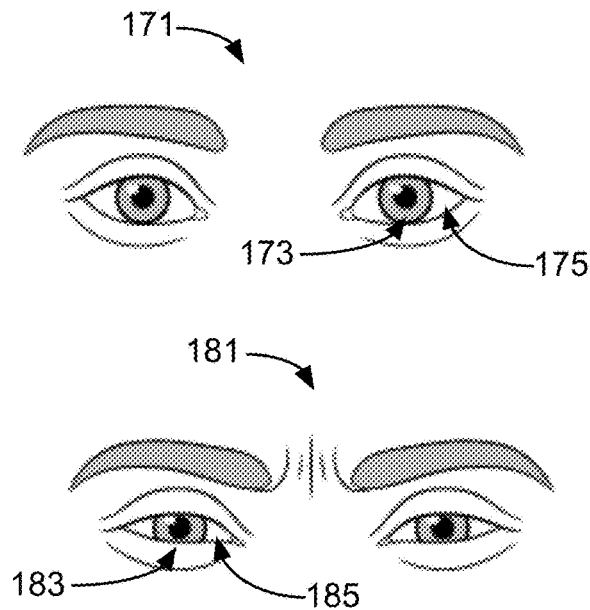
FIG. 6 illustrates an exemplary process for measuring a squint gesture as a user is reading text, in accordance with some embodiments of the present disclosure.

As indicated above, the eye tracker may also be used to collect raw data that is an indirect measurement of reading speed. In some embodiments, the eye tracker may be used to determine whether the user has put glasses on or taken glasses off while reading, both of which may be indicators that a change in font characteristics may be needed. In some embodiments, the eye tracker may be used to determine if the user is squinting while reading. Differences between eyes that are not squinting 171 and eyes that are squinting 181 are illustrated in FIG. 6, and these differences may be detected in images generated by the eye tracker. In the eyes that are not squinting 171, two characteristics can be identified to indicate that the user is not squinting while reading. The first of these characteristics is that the entirety of the pupil 173 can be seen in the images, i.e., the pupil 173 appears as a fully rounded shape. In comparison, in the eyes that are squinting 181, the upper or lower eyelid may impinge on the circular edges of the pupil 183 so that the pupil 183 does not appear to have a fully rounded shape. When the eye tracker generates images that show the pupil 183 not having a fully rounded shape, this may be an indicator that the user is squinting while reading. The second of these characteristics is based on the amount of white from the sclera 175 seen in the images. When the user is not squinting, more white coloration from the sclera 175 is visible in the images as compared to the amount of white coloration from the sclera 185 visible in the images when the user is squinting while reading. Thus, the amount of white coloration from the sclera in the images generated by the eye tracker may be used as an indicator that the user is squinting while reading. When the raw data from the eye tracker indicates the user is squinting while reading, the squinting is an indicator that a change in font characteristics may be needed.

In some embodiments, raw data from the eye tracker may be used to determine the purpose of a rewind action when the user is watching a video with subtitles. For example, in circumstances where a user is watching a video with subtitles, and the user rewinds the video, as the video starts playing again, the user's eye movement can help determine whether the purpose of the rewind was to reread subtitles or to watch a scene in the video again. If the user's eye movement indicates the user is reading, then the rewind can be deduced as being for the purpose of rereading the subtitles. However, if the user's eye movement indicates that the user's gaze remains somewhat fixed or the user's eyes are not moving left to right (when the text is, e.g., English), then the rewind can be deduced as being for some purpose other than rereading the subtitles. In instances when the purpose of the rewind is determined to be for rereading the subtitles, then the user device may include data reflecting the rereading occurrence in the feedback data communicated to the analysis agent.

The feedback data is processed by the analysis agent, which uses a machine learning model, such as a reinforcement learning (RL) model, for this processing and analysis of the feedback data. As is common with machine learning models, the RL model may be initially trained with training data so that it can learn about the data, data types, and other factors that impact the output of the model. This training generates a starting point based on aggregate user behavior which is then customized/personalized to optimize readability for a particular user. In the present context, the RL model is trained using data generated from individuals reading text based on different font characteristics displayed on different types of display screens and in various contexts. In some embodiments, the RL model may be used in a default setting with no initial training. In such embodiments, the RL model may make "explore" vs. "exploit" decisions, in which it explores multiple starting point font characteristics while also exploiting text displayed with default font characteristics, with the goal still being to find and display text with font characteristics that optimize readability. As is also common with machine learning models, the RL model may continue to learn and update how it processes feedback data as it receives and processes feedback data from one or more user devices. In some embodiments, other types of machine learning models may be used by the analysis agent to process the feedback data. Examples of such machine learning models include SARSA, deep Q-learning, and policy gradient models.

The analysis agent is an intelligent agent based on the RL model and, through communications with the user device, exists in a learning environment that includes knowledge about the state of the environment (e.g., the font characteristics currently used to display text to a user), actions that are suggested within the environment (e.g., a change of state from one font characteristics to another font characteristics), rewards for feedback that results from changes of state that improve the user's reading speed, and transition probability of states that aid determining the actions to take. As discussed above, communications between the analysis agent and the user device in this learning environment include identification of the font characteristics used to display text to the user, the feedback from the user device, and recommended changes to the font characteristics used for displaying text to the user. In some embodiments, the communications between the user device and the analysis agent may include additional data that may be included in the processing performed by the analysis agent. The actions recommended by the analysis agent are responses to the present state of the environment, and the rewards represent gains in the reading speed of the user that are attained by the actions. The transition probability of states are guidelines that the analysis agent uses to recommend another font characteristics based on the feedback data and the font characteristics in which text was displayed to the user while the user device generated that feedback data.

Figure 7:
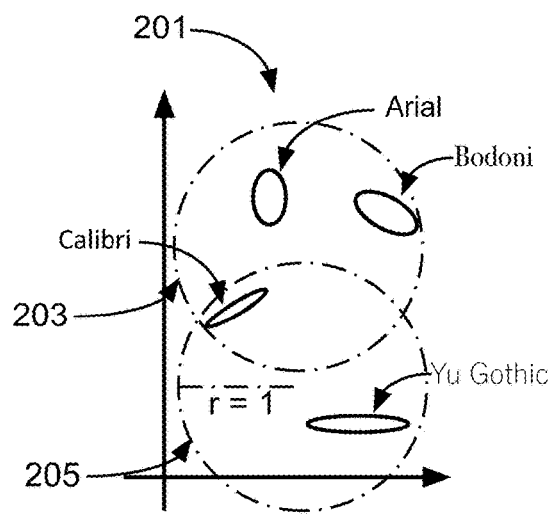
FIG. 7 shows an exemplary 2D space including reduced dimensional representations of a plurality of fonts and corresponding relationships between the fonts in the 2D space, in accordance with some embodiments of the present disclosure.
Figure 8:
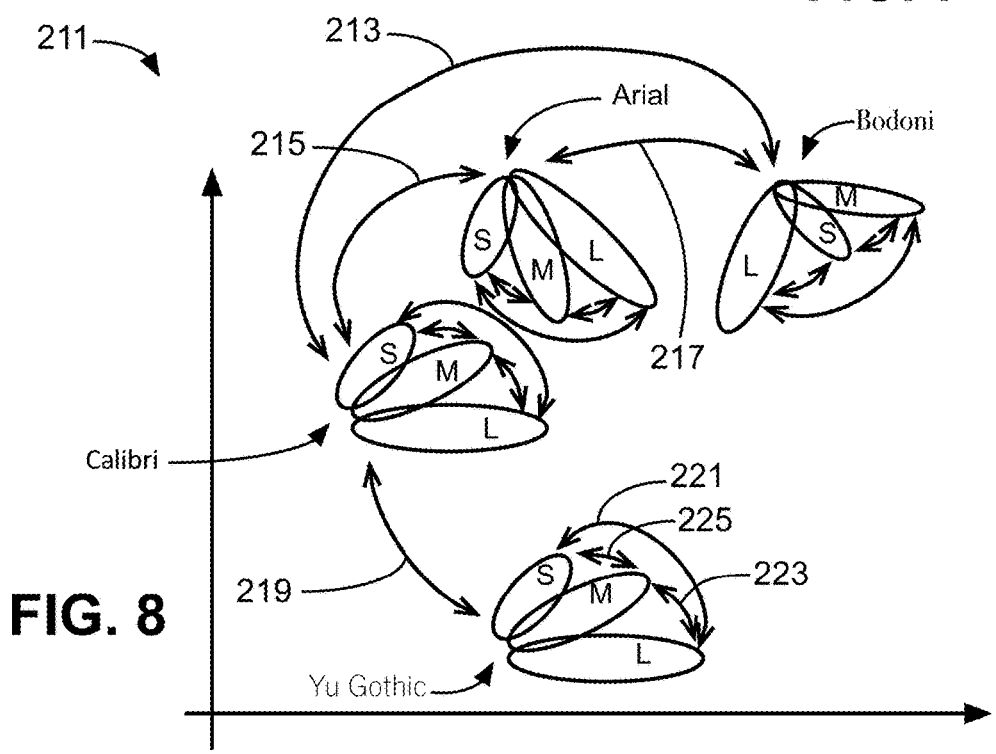
FIG. 8 shows another exemplary 2D space including several reduced dimensional representations of fonts and corresponding relationships between the fonts in the 2D space, in accordance with some embodiments of the present disclosure.

Some transition probability of states are illustrated in FIGS. 7 and 8. A 2D graphical representation 201 of several sets of font characteristics is shown in FIG. 7. This 2D graphical representation 201 is shown as a plot along two axes in Euclidean space, and 2D font representations of twelve sets of font characteristics (Arial, Bodoni, Calibri, and Yu Gothic, each in a small, medium, and large font size) are shown within this 2D space. The units in which the 2D graphical representation is presented and analyzed may be any appropriate units that facilitate analysis and presentation. For example, the units may be chosen such that a unit circle (a circle having a radius of one unit length) may be placed entirely around at least two of the 2D font representations, but fewer than all the 2D font representations included in the 2D graphical representation 201. In the 2D graphical representation 201, a first unit circle 203 is placed around the Arial, Bodoni, and Calibri font characteristics, while a second unit circle 205 is placed around the Calibri and Yu Gothic font characteristics. As shown, any single set of font characteristics may lie within more than one unit circle. These unit circles 203, 205 may be used to define "across font" (AF) actions that are used by the analysis agent to determine which next font characteristics to suggest for displaying text to the user by the user device. An AF action is one in which the analysis agent suggests displaying text to the user based on different font characteristics that include a different font type (the font size may be the same or different) as compared to the font characteristics most recently used. In general, AF actions are used as an aid for identifying font characteristics that can be used for relatively smooth font transitions based upon spatial proximity within the 2D graphical representation 201. In comparison, a "within font" (WF) action is one in which the analysis agent suggests displaying text to the user based on different font characteristics that include the same font type but a larger (or smaller) font size.

In other embodiments, the units may be chosen to facilitate calculations. For example, in some embodiments, an algorithm such as K-nearest neighbor (KNN) may be used to identify 2D font representations that are near enough to each other to define paths for AF actions. In some embodiments, other proximity-based algorithms may also be used for defining appropriate paths for AF actions.

FIG. 8 illustrates a 2D graphical representation 211 that serves as a transition probability of states that may be used by the analysis agent to make suggestions on font characteristics changes to improve, and thereby optimize, readability. The 2D graphical representation 211 includes twelve sets of font characteristics: each of four font types (Arial, Bodoni, Calibri, and Yu Gothic) is paired up with each of three font sizes (small (S), medium (M), and large (L)). The paths available for both AF actions and WF actions are also shown as part of this transition probability of states. There are four AF actions 213, 215, 217, 219 defined within this 2D graphical representation 211. The first AF action 213 enables changes between the Calibri and Bodoni font types. The second AF action 215 enables changes between the Calibri and Arial font types. The third AF action 217 enables changes between the Arial and Bodoni font types. The fourth AF action 219 enables changes between the Calibri and the Yu Gothic font types. With reference to FIG. 7, the three AF actions 213, 215, 217 are all between font characteristics that are enclosed by the first unit circle 203. The fourth AF action 219 is between font characteristics that are enclosed by the second unit circle 205. Since each font type within the 2D graphical representation 211 includes three different font sizes, there are three WF actions 221, 223, 225 associated and available within each font type.

A Q-table 231, which is filled by the analysis agent using feedback from the user device and a transition probability of states, is shown in FIG. 9. For simplification, only six sets of font characteristics, including two font types and three font sizes, are shown in this example Q-table 231. This Q-table 231 includes a column for each set of font characteristics in the transition probability of states, a first row for WF actions and a second row for AF actions. Each column therefore has two cells associated with it, and the cells are initialized to have a zero (or null) value. The analysis agent uses the feedback received from the user device to determine readability scores associated with each set of font characteristics used to display text to the user. To the analysis agent, in this context, a higher readability score is a better reward as compared to a lower readability score. The goal of each subsequent font characteristics suggestion, where the analysis agent is concerned, is to achieve a higher readability score. As is understood in the art of RL models, whether that higher readability score actually occurs is how the analysis agent learns during use. The analysis agent places each determined readability score into the Q-table 231 based on the font characteristics used to display text to the user and whether that font characteristics was suggested through an AF action or a WF action. The first readability score during any analysis is filled into the WF action row.

FIG. 10 shows the progression of the Q-table as it is filled through an iterative process that involves several rounds of the user device presenting text to the reader in a designated set of font characteristics, collecting feedback as the user reads the text, and sending the feedback and the font characteristics to the analysis agent for processing by the RL model. During processing, the analysis agent fills in the Q-table with readability scores and communicates to the user device a suggestion for the next font characteristics to use in displaying text to the user. Since this is an iterative process, the user device displays text to the user in the next font characteristics, collects feedback as the user reads the text, and communicates the newly generated feedback to the analysis agent for ongoing analysis.

The first iteration of the Q-table 241 shows that the analysis agent, through using the RL model analyzing feedback communicated by the user device, assigns a readability score of 50 to text displayed to the user based on the small Calibri font characteristics. The analysis agent fills this readability score into the Q-table 241 at the intersection of the small Calibri column and the WF actions row. The RL model determines that the medium Calibri font characteristics should be used next, and the analysis agent communicates the medium Calibri font characteristics to the user device as the next font characteristics to use for displaying text to the user. Upon receiving the next feedback from the user device, the RL model analyzes the feedback and assigns a readability score of 60 to text displayed to the user in the medium Calibri font characteristics. The analysis agent fills this readability score into the Q-table 251 at the intersection of the medium Calibri column and the WF actions row.

This iterative process continues as the Q-table 261 is filled in with more readability scores. A readability score of 65 for the large Calibri font characteristics is assigned and filled into the Q-table 261 at the intersection of the large Calibri column and the WF actions row. At this stage, having exhausted the Calibri font characteristics options, the analysis agent communicates the medium Arial font characteristics to the user device as the next font characteristics to use for displaying text to the user. Upon receiving the next feedback from the user device, the RL model analyzes the feedback and assigns a readability score of 60 to text displayed to the user in the medium Arial font characteristics. The analysis agent fills this readability score into the Q-table 261 at the intersection of the medium Arial column and the AF actions row. This readability score for the medium Arial font characteristics is inserted into the Q-table 261 in the AF actions row because the change to the medium Arial font characteristics was a change across font characteristics from the large Calibri font characteristics.

After the first display of text to the user following an AF action, the analysis agent may suggest the same font characteristics a second time to gather more feedback on that font characteristics. This is because a user does not always adjust immediately to a change across font characteristics, and by collecting more data for the same font characteristics, in some instances a more accurate readability score may be obtained. In this example, the second time collecting feedback while the user reads text in the medium Arial font characteristics, the RL model assigns a readability score of 100, and the analysis agent fills this readability score into the Q-table 261 at the intersection of the medium Arial font column and the WF actions row. Here, the analysis agent may consider the readability score of 100 to be one that is above a designated threshold and therefore could stop the iterative process here. However, to determine whether readability is optimized for the user under the circumstances, the analysis agent proceeds through further iterations to check both the small Arial font characteristics and the large Arial font characteristics to determine if either of these two font characteristics generates a higher readability score than the medium Arial font characteristics. Through these last two iterations of analysis, the analysis agent fills a readability score of 70 into the Q-table 261 at the intersection of the small Arial font column and the WF action and fills a readability score of 80 into the Q-table 261 at the intersection of the large Arial font column and the WF action. In this example, looking at font characteristics for only two font types, the medium Arial font characteristics receives the highest readability score. Therefore, the analysis agent communicates that the user device should continue displaying text to the user based on the medium Arial font characteristics. Depending upon the context in which the user is reading material (e.g., type of application, size of device display, types and sizes of fonts available in the application, etc.), in certain scenarios the analysis agent may iterate through additional font characteristics before determining the process is complete.

Figure 11:
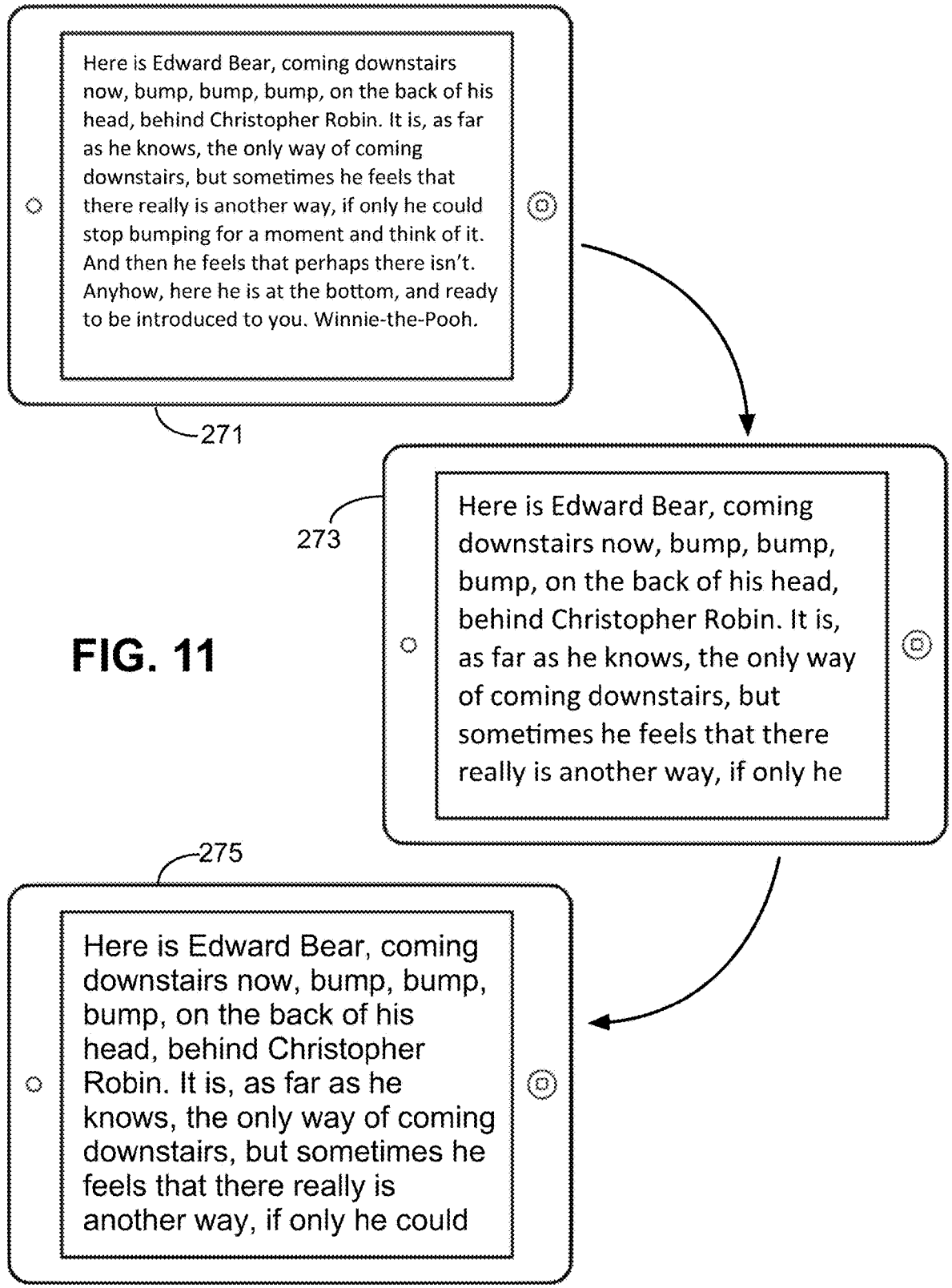
FIG. 11 illustrates an exemplary process of dynamically changing the font characteristics for displaying text to a user for purposes of increasing readability of the text for the user, in accordance with some embodiments of the present disclosure.

FIG. 11 illustrates changes in font characteristics differing in only font sizes as the user device communicates feedback to the analysis agent and receives return communications from the analysis agent suggesting font characteristics changes based on analysis of the feedback. Initially, the display screen of the tablet displays the entire opening paragraph of Winnie-the-Pooh 271 to the user using the small Arial font characteristics. After the tablet device provides feedback to the analysis agent, instructions are received to change to the medium Arial font characteristics instead. The tablet device then changes the text to display based on the medium Arial font characteristics, so that now only part of the opening paragraph of Winnie-the-Pooh 273 is displayed to the user. Again, the tablet device provides feedback to the analysis agent, and instructions are received to change to the large Arial font characteristics instead. The tablet device then changes the text to display based on the large Arial font characteristics, so that now an even more truncated portion of the opening paragraph of Winnie-the-pooh 275 is displayed to the user. As described above with respect to FIG. 10, feedback from the user reading the text displayed with these different font characteristics is analyzed by the analysis agent to assign readability scores and determine which font characteristics optimize readability for the user under the circumstances.

Figure 12:
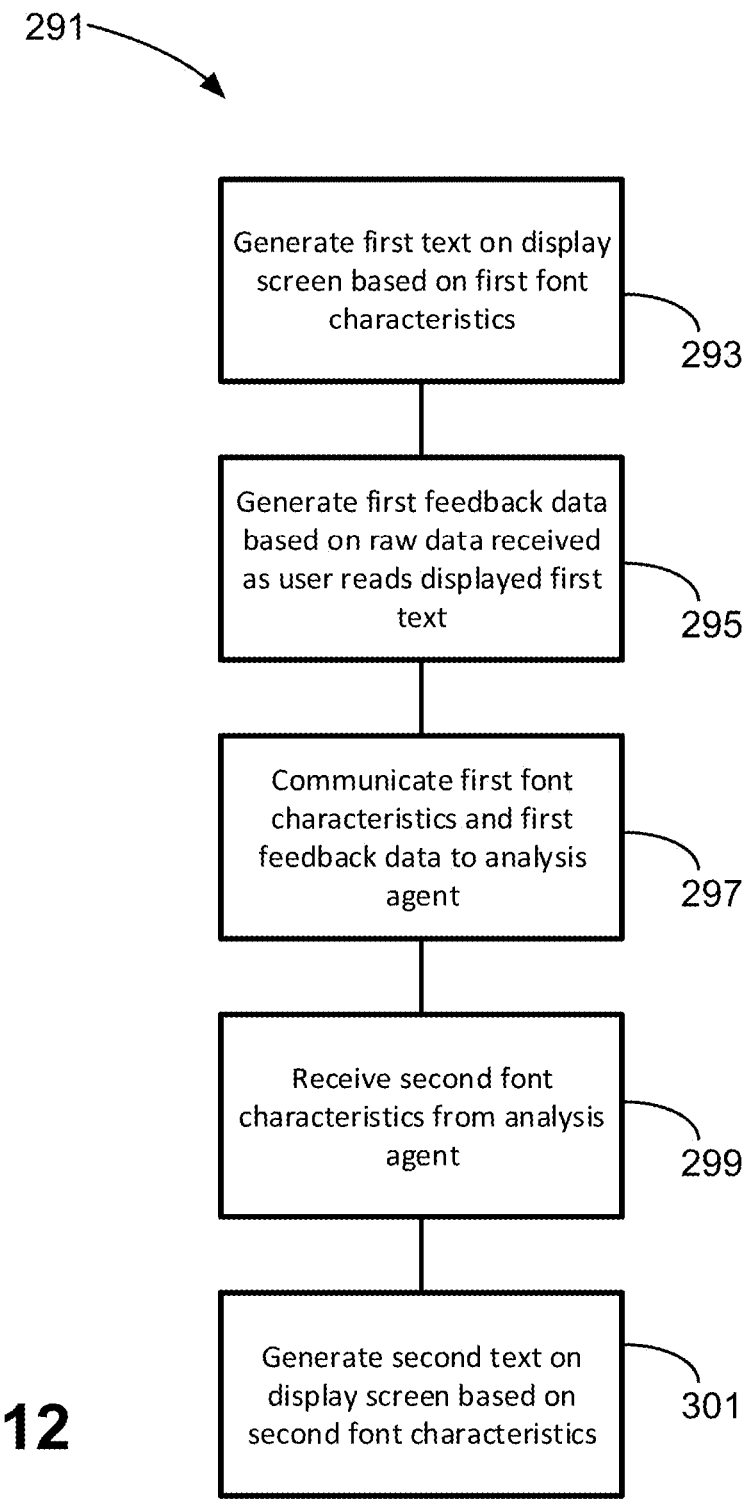
FIG. 12 shows a flowchart of illustrative steps involved in dynamically changing the font characteristics for displaying text to a user for purposes of increasing the readability of the text for the user, in accordance with some embodiments of the present disclosure.

FIG. 12 shows a flowchart illustrating the steps of a process 291 for enabling a user device to adjust the font used to display text to a user while the user is reading the displayed text. The process 291 may be implemented on any of the aforementioned user devices (e.g., user device 11, 51 and the like). In addition, one or more actions of the process 291 may be incorporated into or combined with one or more actions of any other process or embodiments described herein.

At step 293, the user device generates a first text on a display screen based on first font characteristics. For example, the text 271 shown in FIG. 11 may be rendered by the user device for output to the display screen based on the following font characteristics: the font type is Arial; the font size is 12 points; and the font color is black. At step 295, the user device generates first feedback data based on raw data received as the user reads the displayed first text. The raw data is received by the user device, as discussed above, and includes one or more of the types of implicit and explicit feedback data. At step 297, once the user device has generated the first feedback data, the user device then communicates the first font characteristics and the first feedback data to the analysis agent. At step 299, the user device receives the second font characteristics from the analysis agent. The second font characteristics is different from the first font characteristics and will be used to display text to the user on the display screen. At step 301, the user device generates the second text for display on the display screen based on the second font characteristics. For example, the text 273 shown in FIG. 11 may be rendered by the user device for output to the display screen based on the following second font characteristics: the font type is Arial; the font size is 14 points; and the font color is black. Through this process 291, font characteristics changes may be achieved in text displayed to the user based on feedback generated while the user is reading the text.

Figure 13:
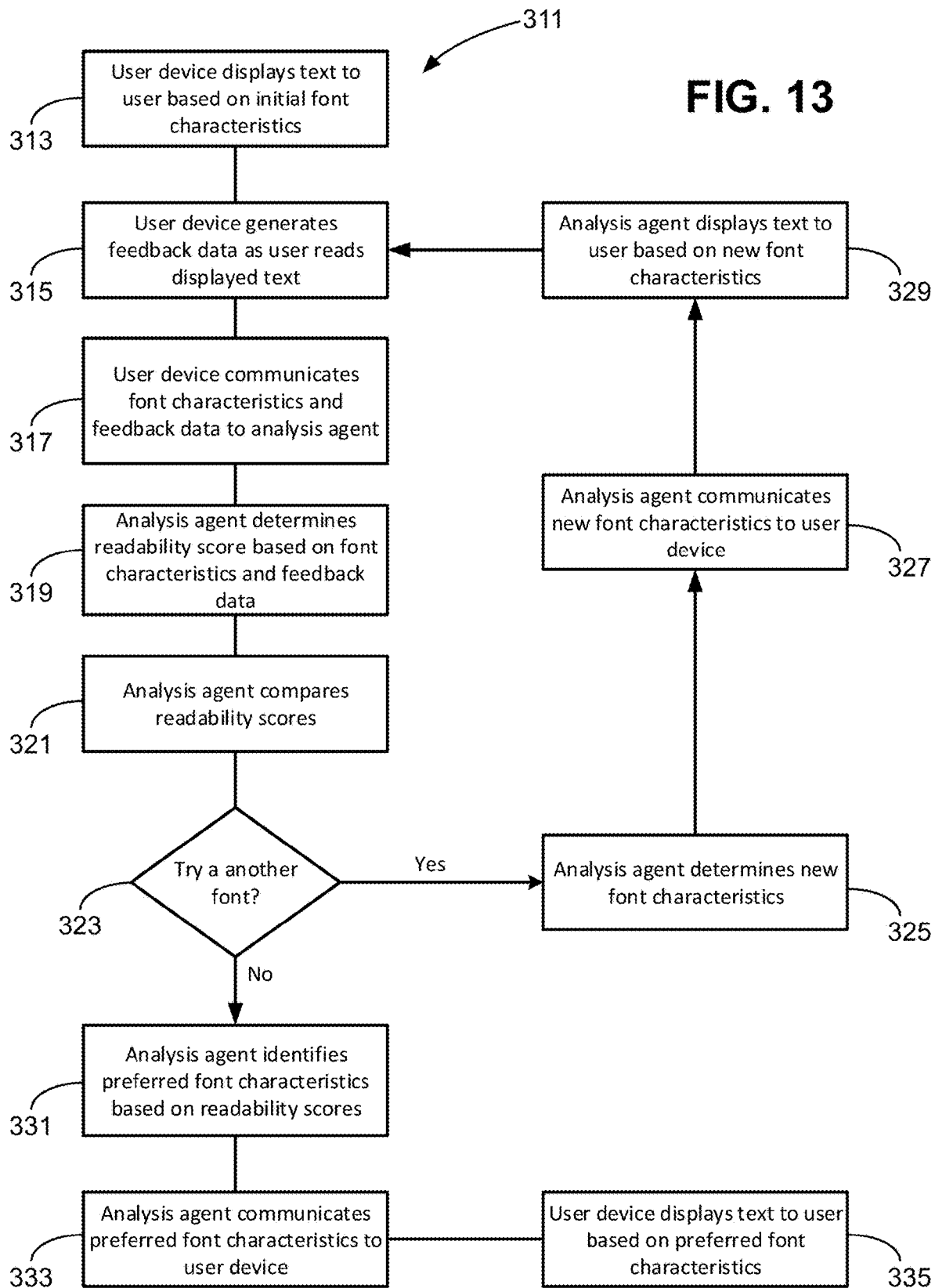
FIG. 13 shows a flowchart of illustrative steps involved in an iterative process for dynamically changing the font characteristics for displaying text to a user for purposes of increasing the readability of the text for the user, in accordance with some embodiments of the present disclosure.

FIG. 13 shows a flowchart illustrating the iterative steps of a process 311 for enabling a user device in combination with an analysis agent to adjust the font characteristics used to display text to a user while the user is reading the displayed text. The process 311 may be implemented using any of the aforementioned user devices (e.g., user device 11, 51 and the like) and analysis agents (e.g., 41, 79). In addition, one or more actions of the process 311 may be incorporated into or combined with one or more actions of any other process or embodiments described herein.

At step 313, the user device generates text on a display screen based on initial font characteristics. For example, the text 37 shown in FIG. 1 may be rendered by the user device for output to the display screen based on the following initial font characteristics: the font type is Arial; the font size is 12 points; and the font color is black. In some embodiments, the user device may communicate with the analysis agent for purposes of selecting the initial font characteristics. In embodiments where the application has limited capabilities to display a wide variety of font characteristics (such as limited font types, font sizes, and/or font colors), the user device may communicate those limitations to the analysis agent either before displaying the text to the user or when first communicating feedback data to the analysis agent. At step 315, the user device generates feedback data based on raw data received as the user reads the displayed text. The raw data is received by the user device, as discussed above, and includes one or more of the types of implicit and explicit feedback data. At step 317, once the user device has generated the feedback data, the user device then communicates to the analysis agent the font characteristics used to display text to the user and the generated feedback data. At step 319, the analysis agent determines the readability score using the RL model to analyze the feedback data associated with the font characteristics. As discussed above, the readability score represents an evaluation of the words per minute read by the user with consideration for any implicit and explicit feedback data generated and communicated by the user device to the analysis agent. As part of determining the readability score, the RL model may assign different weights to different types of feedback data received from the user device. The weights assigned to different aspects of the feedback data largely depend on the training data on which the RL model was initially trained. For example, based on the training data and subsequent analyses of feedback data, the RL model may determine that squinting may be more informative than pauses during reading, or vice versa. As part of the first instance of step 319 during this iterative process 311, the analysis agent initializes the Q-table, in the manner described above, to populate the columns with available and/or preferred font characteristics and set each row and column entry to zero or a null value.

At step 321, the analysis agent inserts the determined readability score into the Q-table for comparison with other readability scores. As part of the first instance of step 321 during this iterative process 311, there are no other readability scores in the Q-table for comparison, such that the first instance of step 321 is limited to inserting the first readability score into the Q-table. At step 323, the analysis agent uses the Q-table to determine if another font characteristics should be tried for displaying text to the user. This determination is based on the readability scores already entered into the Q-table and weights assigned to transitions between font characteristics that are available from the transition probability of states being used by the analysis agent. For example, transitioning between font characteristics having the same font type but different font sizes may be weighted differently as compared to transitioning between font characteristics having different font types. The context of the text being displayed to the user may also contribute to the weights assigned to transitions between font characteristics. If the analysis agent determines at step 323 that different font characteristics should be suggested, then new font characteristics are selected by the analysis agent at step 325. At step 327, the analysis agent communicates the new font characteristics to the user device, and at step 329, the user device displays text to the user on the display screen based on the new font characteristics. The process 311 then continues iteratively with, at step 315, with the user device generating feedback data based on raw data received as the user reads text displayed based on the new font characteristics.

If the analysis agent determines at step 323 that another font characteristics should not be tried, then the process 311 continues to step 331. In certain circumstances, the analysis agent may determine that another font characteristics should not be tried based on explicit feedback originating from the user (e.g., the user pressing a real or virtual button) indicating that changes to the font characteristics should stop. At step 331, the analysis agent identifies preferred font characteristics using the Q-table that has two or more of the readability scores populated. In general, the preferred font characteristics will be the font characteristics with the highest readability score within the Q-table. At step 333, the analysis agent communicates the preferred font characteristics to the user device, and at step 335, the user device displays text to the user on the display screen based on the preferred font characteristics.

Figure 14:
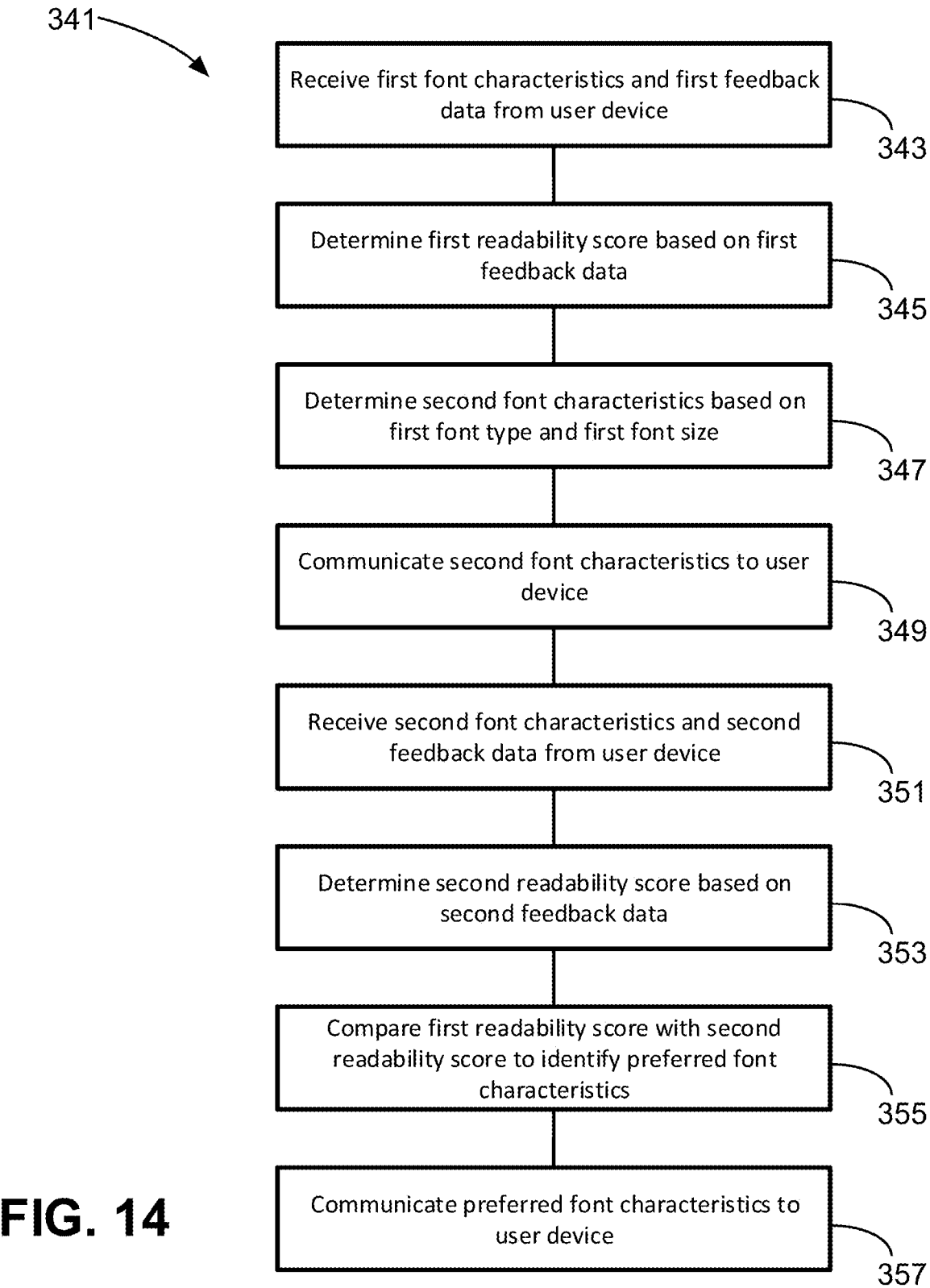
FIG. 14 shows another flowchart of illustrative steps involved in dynamically changing the font characteristics for displaying text to a user for purposes of increasing the readability of the text for the user, in accordance with some embodiments of the present disclosure.

FIG. 14 shows a flowchart illustrating the steps of a process 341 for enabling an analysis agent to interact with and aid a user device in optimizing font characteristics for displaying text to a user. The process 341 may be implemented using any of the aforementioned analysis agents (e.g., 41, 79, and the like). In addition, one or more actions of the process 341 may be incorporated into or combined with one or more actions of any other process or embodiments described herein. At step 343, the analysis agent receives the first font characteristics and the first feedback data from the user device. At step 345, the analysis agent determines a first readability score based on the first feedback data. At step 347, the analysis agent determines second font characteristics based on the first font type and first font size. As described above, the analysis agent may use a transition probability state to determine the second font characteristics. At step 349, the analysis agent communicates the second font characteristics to the user device. Once the user device displays text to the user based on the second font characteristics, the user device generates feedback data, and at step 351, the analysis agent receives the second font characteristics and the second feedback data from the user device. At step 353, the analysis agent determines a second readability score based on the second feedback data. At step 355, the analysis agent compares the first readability score to the second readability score to identify the preferred font characteristics, which are set to one of the first font characteristics or the second font characteristics, depending upon which is associated with the higher readability score. With the preferred font characteristics identified, at step 357 the analysis agent communicates the preferred font characteristics to the user device. As discussed above, the user device then displays text to the user based on the preferred font characteristics.

Figure 15:
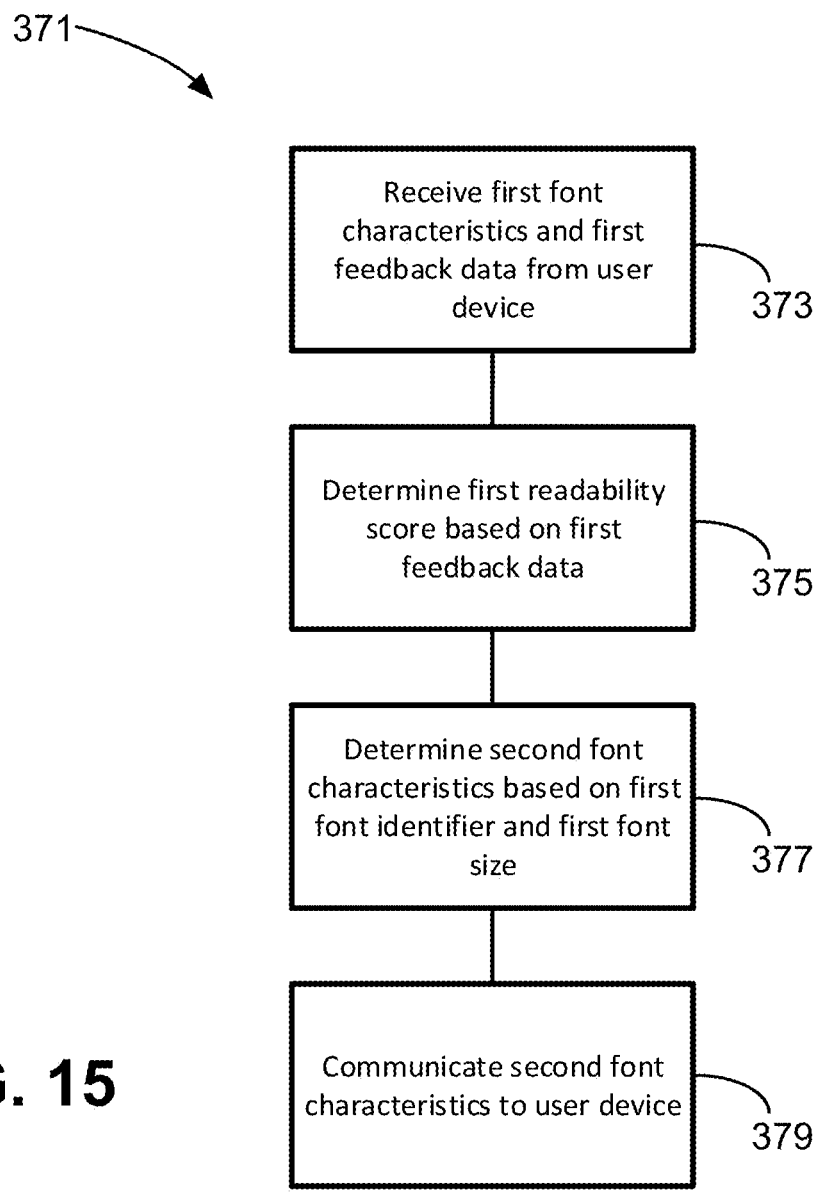
FIG. 15 shows another flowchart of illustrative steps involved in dynamically changing the font characteristics for displaying text to a user for purposes of increasing the readability of the text for the user, in accordance with some embodiments of the present disclosure.

FIG. 15 illustrates a flowchart showing the steps of a process 371 for enabling an analysis agent to interact with and aid a user device in changing font characteristics used to display text to a user while the user is reading the displayed text. The process 371 may be implemented using any of the aforementioned analysis agents (e.g., 41, 79, and the like). In addition, one or more actions of the process 371 may be incorporated into or combined with one or more actions of any other process or embodiments described herein. At step 373, the analysis agent receives the first font characteristics and the first feedback data from the user device. At step 375, the analysis agent determines a first readability score based on the first feedback data. At step 377, the analysis agent determines second font characteristics based on the first font type and first font size. As described above, the analysis agent may use a transition probability states to determine the second font characteristics. At step 379, the analysis agent communicates the second font characteristics to the user device. With the second font characteristics determined, at step 379 the analysis agent communicates the second font characteristics to the user device. As discussed above, the user device then displays text to the user based on the second font characteristics. Through this process 371, font characteristics changes may be achieved in text displayed to the user based on feedback generated while the user is reading the text.

Figure 16:
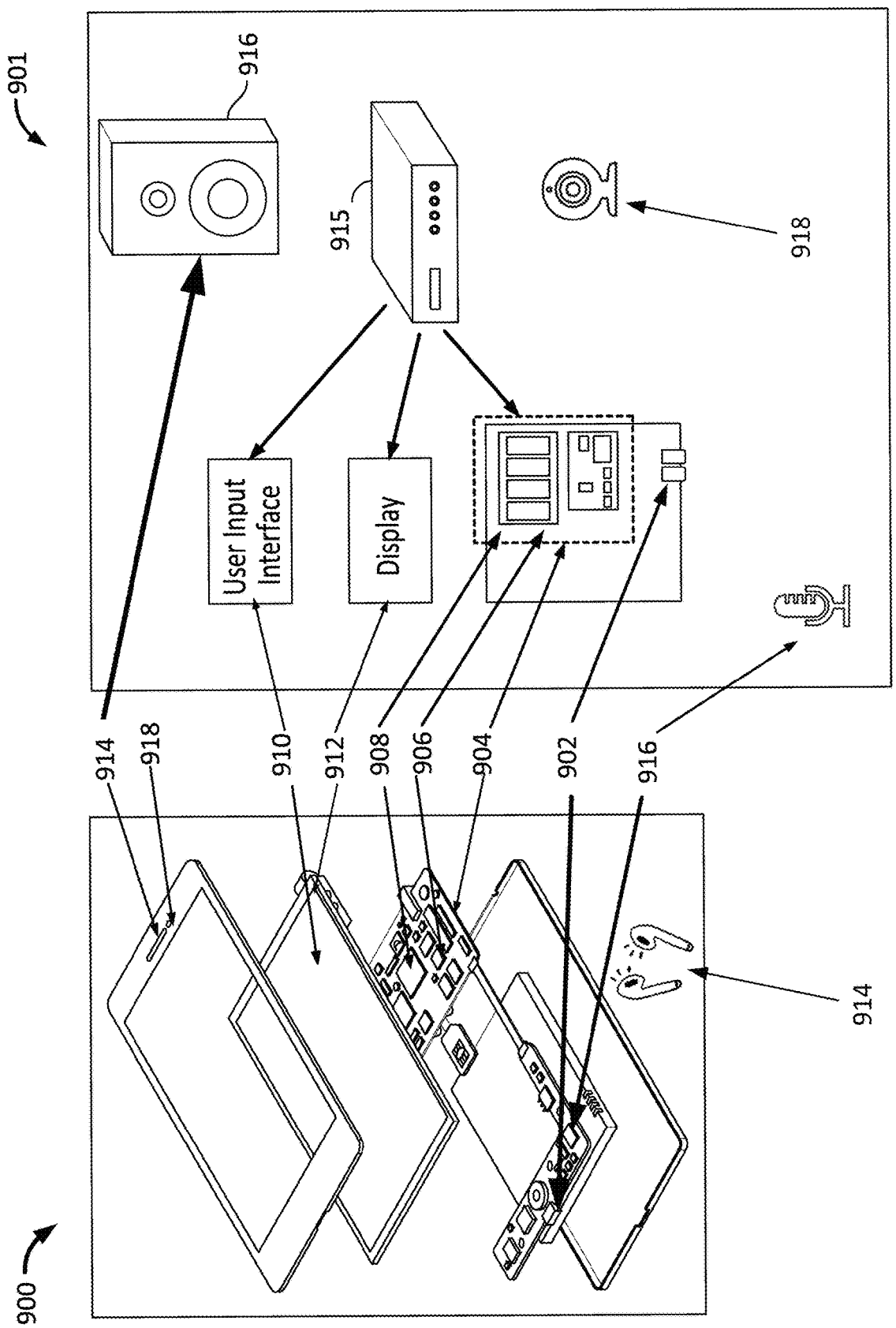
FIG. 16 shows illustrative user devices, in accordance with some embodiments of this disclosure.
Figure 17:
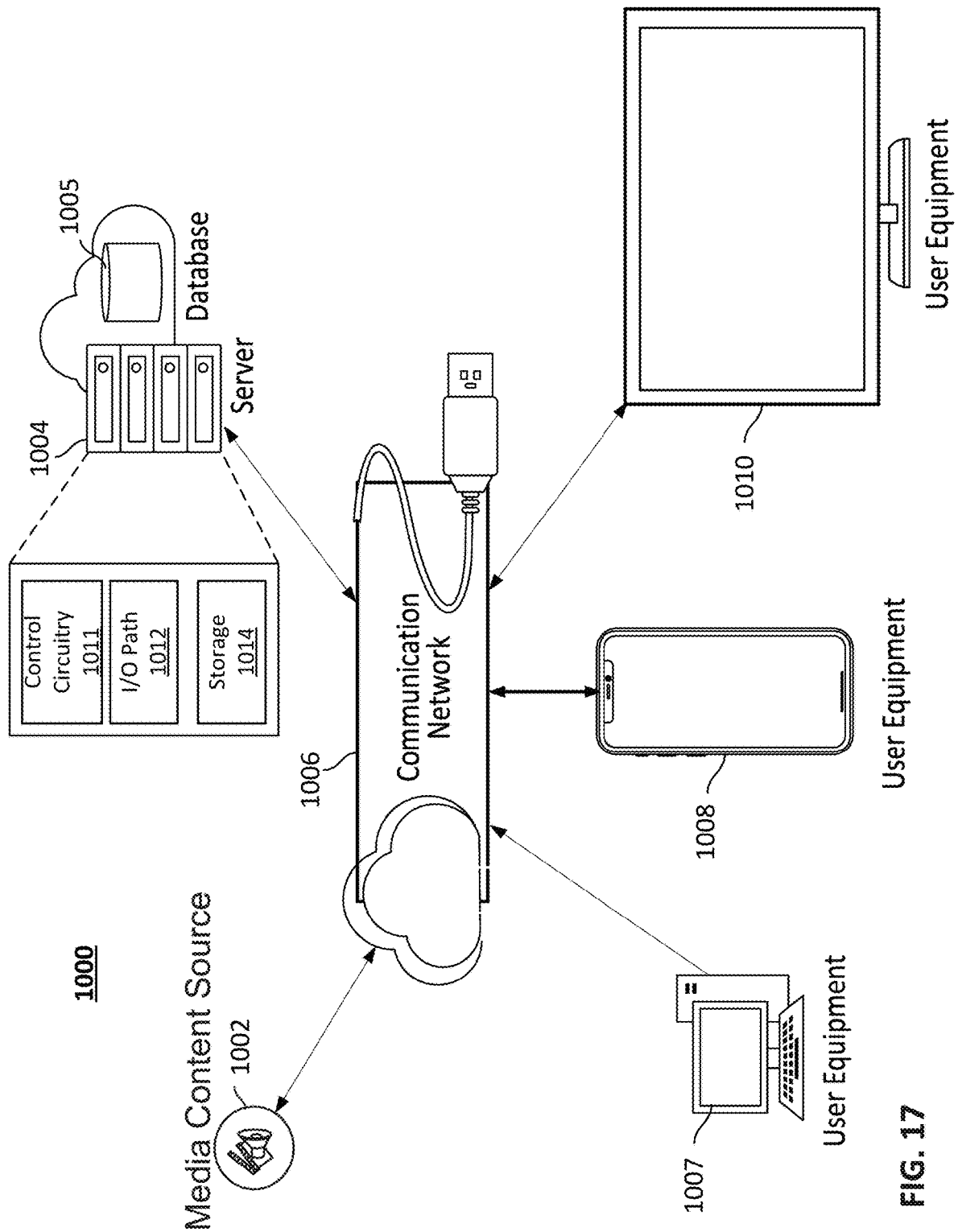
FIG. 17 shows illustrative systems, in accordance with some embodiments of this disclosure.

FIGS. 16 and 17 describe illustrative devices, systems, servers, and related hardware that may be used as the user device, in accordance with some embodiments of this disclosure. FIG. 16 shows generalized embodiments of illustrative user devices 900 and 901, which may correspond to, e.g., the user device 11 and/or 51 of FIG. 1 or FIG. 2. For example, user equipment device 900 may be a smartphone device, a tablet, smart glasses, a virtual reality or augmented reality device, or any other suitable device capable of displaying text to a user for reading and capable of transmitting and receiving data over a communication network. In another example, user equipment device 901 may be a television equipment system or device. A television equipment device 901 may include a set-top box 915. The set-top box 915 may be communicatively connected to a microphone 916, audio output equipment (e.g., speaker or headphones 914), and a display 912. In some embodiments, the display 912 may be a television display or a computer display. In some embodiments, the set-top box 915 may be communicatively connected to a user input interface 910. In some embodiments, the user input interface 910 may be a remote-control device. The set-top box 915 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of television equipment devices are discussed below in connection with FIG. 16. In some embodiments, device 900 may comprise any suitable number of sensors, as well as a GPS module (e.g., in communication with one or more servers and/or cell towers and/or satellites) to ascertain a location of device 900.

Each one of the user equipment device 900 and the user equipment device 901 may receive content and data via an input/output (I/O) path 902. The I/O path 902 may provide content (e.g., broadcast programming, on-demand programming, Internet content, content available over a local area network (LAN) or wide area network (WAN), and/or other content) and data to control circuitry 904, which may comprise processing circuitry 906 and storage 908. The control circuitry 904 may be used to send and receive commands, requests, and other suitable data using the I/O path 902, which may comprise I/O circuitry. The I/O path 902 may connect the control circuitry 904 (and specifically processing circuitry 906) to one or more communications paths (described below). I/O functions may be provided by one or more of these communications paths, but are shown as a single path in FIG. 16 to avoid overcomplicating the drawing. While the set-top box 915 is shown in FIG. 16 for illustration, any suitable computing device having processing circuitry, control circuitry, and storage may be used in accordance with the present disclosure. For example, the set-top box 915 may be replaced by, or complemented by, a personal computer (e.g., a notebook, a laptop, a desktop), a smartphone (e.g., device 900), a tablet, a network-based server hosting a user-accessible client device, a non-user-owned device, any other suitable device, or any combination thereof.

The control circuitry 904 may be based on any suitable control circuitry such as processing circuitry 906. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel® Core i7 processors) or multiple different processors (e.g., an Intel® Core i5 processor and an Intel® Core i7 processor). In some embodiments, the control circuitry 904 executes instructions stored in memory (e.g., storage 908). Specifically, the control circuitry 904 may be instructed to perform the functions discussed above and below. In some implementations, processing or actions performed by the control circuitry 904 may be based on instructions received from the analysis agent.

The control circuitry 904 may include communications circuitry suitable for communicating with the analysis agent, a server or other networks or servers. The instructions for performing any of the embodiments discussed herein of the user device may be encoded on non-transitory computer-readable media (e.g., a hard drive, random-access memory on a DRAM integrated circuit, read-only memory on a [BLU-RAY disk] BLU-RAY Disc™, etc.). For example, in FIG. 16, the instructions may be stored in storage 908, and executed by control circuitry 904 of a device 900.

Control circuitry 904 may include communications circuitry suitable for communicating with a server, social network service, a table or database server, or other networks or servers The instructions for carrying out the above-mentioned functionality may be stored on a server (which is described in more detail in connection with FIG. 9). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 9). In addition, communications circuitry may include circuitry that enables peer-to-peer communication of user equipment devices, or communication of user equipment devices in locations remote from each other (described in more detail below).

Memory may be an electronic storage device provided as storage 908 that is part of control circuitry 904. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY Disc®, etc. (BD) recorders, BLU-RAY 3D® disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 908 may be used to store various types of content or data described herein. Nonvolatile memory may also be used (e.g., to launch a boot-up routine and other instructions). Cloud-based storage may be used to supplement storage 908 or instead of storage 908.

Control circuitry 904 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 904 may also include scaler circuitry for upconverting and downconverting content into the preferred output format of user equipment 900. Control circuitry 904 may also include digital-to-analog converter circuitry and analog-to-digital converter circuitry for converting between digital and analog signals. The tuning and encoding circuitry may be used by user equipment device 900, 901 to receive and to display, to play, or to record content. The tuning and encoding circuitry may also be used to receive media consumption data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 908 is provided as a separate device from user equipment device 900, the tuning and encoding circuitry (including multiple tuners) may be associated with storage 908.

Control circuitry 904 may receive instruction from a user by way of user input interface 910. User input interface 910 may be any suitable user interface, such as a remote control, mouse, trackball, keypad, keyboard, touch screen, touchpad, stylus input, joystick, voice recognition interface, or other user input interfaces. Display 912 may be provided as a stand-alone device or integrated with other elements of each one of user equipment device 900 and user equipment device 901. For example, display 912 may be a touchscreen or touch-sensitive display. In such circumstances, user input interface 910 may be integrated with or combined with display 912. In some embodiments, user input interface 910 includes a remote-control device having one or more microphones, buttons, keypads, any other components configured to receive user input or combinations thereof. For example, user input interface 910 may include a handheld remote-control device having an alphanumeric keypad and option buttons. In a further example, user input interface 910 may include a handheld remote-control device having a microphone and control circuitry configured to receive and identify voice commands and transmit information to set-top box 915.

Audio output equipment 914 may be integrated with or combined with display 912. Display 912 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 912. Audio output equipment 914 may be provided as integrated with other elements of each one of device 900 and equipment 901 or may be stand-alone units. An audio component of videos and other content displayed on display 912 may be played through speakers (or headphones) of audio output equipment 914. In some embodiments, audio may be distributed to a receiver (not shown), which processes and outputs the audio via speakers of audio output equipment 914. In some embodiments, for example, control circuitry 904 is configured to provide audio cues to a user, or other audio feedback to a user, using speakers of audio output equipment 914. There may be a separate microphone 916 or audio output equipment 914 may include a microphone configured to receive audio input such as voice commands or speech. For example, a user may speak letters or words that are received by the microphone and converted to text by control circuitry 904. In a further example, a user may voice commands that are received by a microphone and recognized by control circuitry 904. Camera 918 may be any suitable video camera integrated with the equipment or externally connected. Camera 918 may be a digital camera comprising a charge-coupled device (CCD) and/or a complementary metal-oxide semiconductor (CMOS) image sensor. Camera 918 may be an analog camera that converts to digital images via a video card.

The user device may be implemented using any suitable architecture. For example, it may be a stand-alone application wholly-implemented on each one of user equipment device 900 and user equipment device 901. In such an approach, instructions of the application may be stored locally (e.g., in storage 908), and data for use by the application is downloaded on a periodic basis (e.g., from an out-of-band feed, from an Internet resource, or using another suitable approach). Control circuitry 904 may retrieve instructions of the application from storage 908 and process the instructions to provide media consumption and social network interaction functionality and generate any of the displays discussed herein. Based on the processed instructions, control circuitry 904 may determine what action to perform when input is received from user input interface 910. For example, movement of a cursor on a display up/down may be indicated by the processed instructions when user input interface 910 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 904 may allow a user to provide user profile information or may automatically compile user profile information. For example, control circuitry 904 may access and monitor network data, video data, audio data, processing data, participation data from a social network profile. Control circuitry 904 may obtain all or part of other user profiles that are related to a particular user (e.g., via social media networks), and/or obtain information about the user from other sources that control circuitry 904 may access. As a result, a user can be provided with a unified experience across the user's different devices.

FIG. 17 is a diagram of an illustrative system 1000, in accordance with some embodiments of this disclosure. User devices 11, 51 (e.g., user device of FIG. 1 or FIG. 2, or any other suitable devices, or any combination thereof) may be coupled to communication network 1006. Communication network 1006 may be one or more networks including the Internet, a mobile phone network, mobile voice or data network (e.g., a 5G, 4G, or LTE network, or any other suitable network or any combination thereof), cable network, public switched telephone network, or other types of communication network or combinations of communication networks. Paths (e.g., depicted as arrows connecting the respective devices to the communication network 1006) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 17 to avoid overcomplicating the drawing.

Although communications paths are not drawn between, e.g., user equipment devices 1007, 1008, 1010, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 1006.

The system 1000 may comprise media content source 1002, one or more servers 1004, and one or more social network services.

In some embodiments, server 1004 may include control circuitry 1011 and storage 1014 (e.g., RAM, ROM, Hard Disk, Removable Disk, etc.). Storage 1014 may store one or more databases (e.g., database 1005). Server 1004 may also include an input/output path 1012. I/O path 1012 may provide media consumption data, social networking data, device information, or other data, over a local area network (LAN) or wide area network (WAN), and/or other content and data to control circuitry 1011, which may include processing circuitry, and storage 1014. Control circuitry 1011 may be used to send and receive commands, requests, and other suitable data using I/O path 1012, which may comprise I/O circuitry. I/O path 1012 may connect control circuitry 1011 (and specifically control circuitry) to one or more communications paths. I/O path 1012 may comprise I/O circuitry.

Control circuitry 1011 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 1011 may be distributed across multiple separate processors or processing units, for example, multiple of the same type of processing units (e.g., two Intel® Core i7 processors) or multiple different processors (e.g., an Intel® Core i5 processor and an Intel® Core i7 processor). In some embodiments, control circuitry 1011 executes instructions for an emulation system application stored in memory (e.g., the storage 1014). Memory may be an electronic storage device provided as storage 1014 that is part of control circuitry 1011.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   generating, at an output, first text rendered based on first font characteristics to display on a display screen for reading by a user;
   generating first feedback data based on first raw data received via an input as the user reads the first text displayed on the display screen;
   determining a first readability score of the first text based at least in part on the first feedback data;
   identifying a data point representing the first font characteristics in a mapping of a plurality of font characteristics;
   determining second font characteristics, different from the first font characteristics, based at least in part on the first readability score and a second data point a first distance away from the data point representing the first font characteristics;
   generating, at the output, second text rendered based on the second font characteristics to display on the display screen for reading by the user;
   generating second feedback data based on second raw data received via the input as the user reads the second text displayed on the display screen;
   determining a second readability score of the second text based at least in part on the second feedback data;
   determining preferred font characteristics, comprising one of the first font characteristics and the second font characteristics, based at least in part on the first readability score, second readability score and a third data point representing the preferred font characteristics located a second distance from the data point representing the first font characteristics and a third distance from the second data point representing the second font characteristics; and
   generating, at the output, additional text rendered based on the preferred font characteristics to display on the display screen for reading by the user.

2. The method of claim 1, wherein:
   the first font characteristics comprise a first font type and a first font size; and
   the second font characteristics comprise a second font type and a second font size.

3. The method of claim 1, wherein:
   the first font characteristics comprise a first font color; and
   the second font characteristics comprise a second font color.

4. The method of claim 1, wherein:
   generating the first feedback data comprises generating the first raw data by controlling an eye tracking system; and
   generating the second feedback data comprises generating the second raw data by controlling the eye tracking system.

5. The method of claim 4, wherein:
   generating the first feedback data comprises:
      generating the first raw data by controlling the eye tracking system to track first eye movements of the user as the user reads the first text on the display screen; and
      determining a first reading speed of the user based on the first eye movements; and
   generating the second feedback data comprises:
      generating the second raw data by controlling the eye tracking system to track second eye movements of the user as the user reads the second text on the display screen; and
      determining a second reading speed of the user based on the second eye movements.

6. The method of claim 4, wherein:
   generating the first feedback data comprises generating the first raw data by controlling the eye tracking system to track first squinting gestures of the user as the user reads the first text on the display screen; and
   generating the second feedback data comprises generating the second raw data by controlling the eye tracking system to track second squinting gestures of the user as the user reads the second text on the display screen.

7. The method of claim 4, wherein:
   generating the first feedback data comprises generating the first raw data by controlling the eye tracking system to track first backtrack eye movements of the user as the user reads the first text on the display screen; and
   generating the second feedback data comprises generating the second raw data by controlling the eye tracking system to track second backtrack eye movements of the user as the user reads the second text on the display screen.

8. The method of claim 1, wherein:
   generating the first feedback data comprises receiving, via the input, instructions from the user to perform a first text display action as the user reads the first text on the display screen; and
   generating the second feedback data comprises receiving, via the input, instructions from the user to perform a second text display action as the user reads the second text on the display screen.

9. The method of claim 8, wherein the first text display action comprises one or more of a font size change action, a font color change action, and text pause change action, a stop font change action, and a step backward change action.

10. A system comprising:
   input/output circuitry configured to:
      communicate with a display screen;
      receive raw data;
   a network interface for communicating with an analysis agent; and
   control circuitry configured to:
      generate, at the output, first text rendered based on first font characteristics to display on the display screen for reading by a user;
      generate first feedback data from the first raw data received via the input/output circuitry as the user reads the generated first text displayed on the display screen;
      determine a first readability score of the first text based at least in part on the first feedback data;
      identify a data point representing the first font characteristics in a mapping of a plurality of font characteristics;
      determine second font characteristics, different from the first font characteristics, based at least in part on the first readability score and a second data point a first distance away from the data point representing the first font characteristics;
      generate, at the input/output circuitry, second text rendered based on the second font characteristics to display on the display screen for reading by the user;

generate second feedback data from the second raw data received via the input/output circuitry as the user reads the generated second text displayed on the display screen;

determine a second readability score of the second text based at least in part on the second feedback data;

determine preferred font characteristics, comprising one of the first font characteristics and the second font characteristics, based at least in part on the first readability score, second readability score and a third data point representing the preferred font characteristics located a second distance from the data point representing the first font characteristics and a third distance from the second data point representing the second font characteristics;

generate, at the input/output circuitry, additional text rendered based on the preferred font characteristics to display on the display screen for reading by the user.

11. The system of claim 10, wherein:
the first font characteristics comprise a first font type and a first font size; and
the second font characteristics comprise a second font type and a second font size.

12. The system of claim 10, wherein:
the first font characteristics comprise a first font color; and
the second font characteristics comprise a second font color.

13. The system of claim 10, wherein the control circuitry is further configured to:
generate the first feedback data by controlling an eye tracking system; and
generate the second feedback data by controlling the eye tracking system.

14. The system of claim 13, wherein the control circuitry is further configured to:
generate the first raw data by controlling the eye tracking system to track first eye movements of the user as the user reads the first text on the display screen;
generate the first feedback data by determining a first reading speed of the user based on the first eye movements;
generate the second raw data by controlling the eye tracking system to track second eye movements of the user as the user reads the second text on the display screen; and
generate the second feedback data by determining a second reading speed of the user based on the second eye movements.

15. The system of claim 13, wherein the control circuitry is further configured to:
generate the first raw data by controlling the eye tracking system to track first squinting gestures of the user as the user reads the first text on the display screen; and generate the second raw data by controlling the eye tracking system to track second squinting gestures of the user as the user reads the second text on the display screen.

16. The system of claim 13, wherein the control circuitry is further configured to:
generate the first raw data by controlling the eye tracking system to track first backtrack eye movements of the user as the user reads the first text on the display screen; and
generate the second raw data by controlling the eye tracking system to track second backtrack eye movements of the user as the user reads the second text on the display screen.

17. The system of claim 10, wherein the control circuitry is further configured to:
generate the first feedback data based on the first raw data comprising instructions from the user to perform a first text display action as the user reads the first text on the display screen; and
generate the second feedback data based on the second raw data comprising instructions from the user to perform a second text display action as the user reads the second text on the display screen.

18. The method of claim 17, wherein the first text display action comprises one or more of a font size change action, a font color change action, and text pause change action, a stop font change action, and a step backward change action.

19. A method comprising:
generating, at an output, first text rendered based on first font characteristics to display on a display screen for reading by a user;
generating first feedback data based on first raw data received via an input as the user reads the generated first text displayed on the display screen;
determining a first readability score of the first text based at least in part on the first feedback data;
identifying a data point representing the first font characteristics in a mapping of a plurality of font characteristics;
determining second font characteristics, different from the first font characteristics, based at least in part on the first readability score and a second data point a first distance away from the data point representing the first font characteristics;
generating, at the output, second text rendered based on the second font characteristics to display on the display screen for reading by the user.

20. The method of claim 19, wherein:
the first font characteristics comprise a first font type and a first font size; and
the second font characteristics comprise a second font type and a second font size.

* * * * *